(12) United States Patent
Sasaki et al.

(10) Patent No.: US 10,193,119 B2
(45) Date of Patent: Jan. 29, 2019

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Tomokazu Sasaki, Tokyo (JP); Hiromi Takamatsu, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 12 days.

(21) Appl. No.: 15/315,474

(22) PCT Filed: Jun. 1, 2015

(86) PCT No.: PCT/JP2015/002763
§ 371 (c)(1),
(2) Date: Dec. 1, 2016

(87) PCT Pub. No.: WO2015/198534
PCT Pub. Date: Dec. 30, 2015

(65) Prior Publication Data
US 2017/0200932 A1    Jul. 13, 2017

(30) Foreign Application Priority Data
Jun. 27, 2014   (JP) .................... 2014-132999

(51) Int. Cl.
*H01M 2/16*     (2006.01)
*H01M 2/14*     (2006.01)
*H01M 10/0525*  (2010.01)

(52) U.S. Cl.
CPC .......... *H01M 2/166* (2013.01); *H01M 2/145* (2013.01); *H01M 2/1686* (2013.01); *H01M 10/0525* (2013.01)

(58) Field of Classification Search
CPC ............................ H01M 2/166; H01M 2/1686
See application file for complete search history.

(56) References Cited

U.S. PATENT DOCUMENTS

| | | | | |
|---|---|---|---|---|
| 2007/0264577 A1* | 11/2007 | Katayama | ............. | H01M 2/162 429/246 |
| 2012/0189897 A1* | 7/2012 | Wakizaka | ............. | H01M 2/145 429/144 |

FOREIGN PATENT DOCUMENTS

| | | |
|---|---|---|
| EP | 2485302 A1 | 8/2012 |
| EP | 2835844 A1 | 2/2015 |

(Continued)

OTHER PUBLICATIONS

Dec. 27, 2016, International Preliminary Report on Patentability issued in the International Patent Application No. PCT/JP2015/002763.

(Continued)

*Primary Examiner* — Wyatt P McConnell
(74) *Attorney, Agent, or Firm* — Kenja IP Law PC

(57) ABSTRACT

Provided is a means for beneficially solving the problems of increasing separator productivity and further improving adhesion between an electrode and a separator in electrolysis solution while ensuring battery characteristics. A composition for non-aqueous secondary battery functional layer is provided that contains non-conductive inorganic particles and organic particles, wherein a difference in density between the non-conductive inorganic particles and the organic particles (non-conductive inorganic particles' density—organic particles' density) is 1.5 g/cm$^3$ or more, and the organic particles each have a core-shell structure having (Continued)

a core and a shell that partially covers an outer surface of the core, wherein the core is made of polymer having a degree of swelling in electrolysis solution of 5 times to 30 times, and the shell is made of polymer having a degree of swelling in electrolysis solution of greater than 1 time to 4 times.

9 Claims, 1 Drawing Sheet

(56) References Cited

FOREIGN PATENT DOCUMENTS

| JP | 2012204303 A | 10/2012 |
|---|---|---|
| WO | 2011040474 A1 | 4/2011 |
| WO | 2013151144 A1 | 10/2013 |

OTHER PUBLICATIONS

Charles M. Hansen, "Hansen Solubility Parameters: A User's Handbook, Second Edition", CRC Press, Inc., 2007.

* cited by examiner

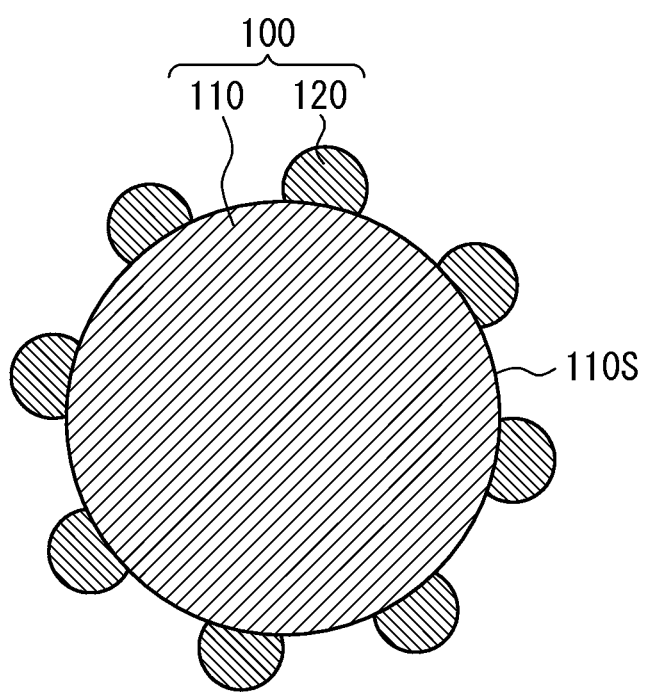

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

This disclosure relates to a composition for non-aqueous secondary battery functional layer, a functional layer for non-aqueous secondary battery, and a non-aqueous secondary battery.

BACKGROUND

Non-aqueous secondary batteries, such as lithium ion secondary batteries, are small and light, high in energy density, and capable of repeated cycles of charge and discharge. For such characteristics, secondary batteries are used in a wide variety of applications. A non-aqueous secondary battery generally includes battery members such as a positive electrode, a negative electrode, and a separator for separating the positive electrode and negative electrode from each other to prevent a short-circuit between them.

Separators that include a substrate made of, for example, polyolefin material such as polyethylene or polypropylene (hereinafter occasionally referred to as a "separator substrate") and a protection film provided on the substrate for improving heat resistance and puncture resistance have heretofore been used. As the protection layer to be provided on the separator substrate, porous membranes formed of non-conductive particles such as organic or inorganic microparticles bound to one another with a binder have been used (see, e.g., PTL 1).

Recently, in efforts to enhance the performance of non-aqueous secondary batteries, studies have been made to further improve separators having a porous membrane (see, e.g., PTL 2).

Specifically, for example, PTL 2 proposes a separator manufactured by forming on a separator substrate a porous membrane layer containing non-conductive particles and binder and providing on the porous membrane layer an adhesive layer containing a specific particulate polymer. PTL 2 reports that the use of a separator having the adhesive layer on the porous membrane layer allows the separator to be well bonded to the electrode thus improving battery characteristics of a secondary battery.

CITATION LIST

Patent Literature

PTL 1: WO2011040474A
PTL 2: WO2013151144A

SUMMARY

Technical Problem

However, while the conventional separators having a porous membrane layer and an adhesive layer can exhibit increased adhesion to an electrode compared to those free of an adhesive layer, manufacture of such a separator requires sequential steps of forming a porous membrane layer on a separator substrate and forming an adhesive layer on the porous membrane layer, resulting in the manufacturing process being complex. Hence, the conventional separators have room for improvement in simplifying the manufacturing process to improve productivity.

Further, the adhesive layer in the conventional separators exhibits insufficient adhesion in electrolysis solution. Thus, secondary batteries including such a separator also have room for improvement in enhancing adhesion between the electrode and separator in electrolysis solution while ensuring battery characteristics.

It would therefore be helpful to provide means for advantageously attaining the aforementioned improvements.

Solution to Problem

The inventors made extensive studies to solve the aforementioned problems. The inventors conceived of forming on a separator substrate a single layer (hereinafter occasionally referred to as a "functional layer") capable of exerting both a protection function as a porous membrane layer and an adhesion function as an adhesion layer at the same time, instead of a porous membrane layer and an adhesive layer, so that the manufacturing process of a separator is simplified for increased productivity. The inventors made further studies and established that a non-aqueous secondary battery functional layer can be obtained that can well exert functions of both of a porous membrane layer and an adhesive layer (protection function and adhesion function) with a single layer and can increase adhesion between an electrode and a separator in electrolysis solution while ensure battery characteristics, by forming the functional layer using a composition that contains: organic particles having a specific structure and a specific degree of swelling in electrolysis solution; and non-conductive inorganic particles having a density higher than that of the organic particles by a specific amount or more. The inventors thus completed this disclosure.

Namely, this disclosure is aimed at advantageously solving the aforementioned problem. The composition disclosed herein for non-aqueous secondary battery functional layer contains non-conductive inorganic particles and organic particles, wherein a difference in density between the non-conductive inorganic particles and the organic particles (non-conductive inorganic particles' density—organic particles' density) is 1.5 g/cm$^3$ or more, and the organic particles each have a core-shell structure having a core and a shell that partially covers an outer surface of the core, wherein the core is made of polymer having a degree of swelling in electrolysis solution of 5 times to 30 times, and the shell is made of polymer having a degree of swelling in electrolysis solution of greater than 1 time to 4 times. Using the specific organic particles described above and non-conductive inorganic particles having a 1.5 g/cm$^3$ or higher density than the organic particles as described above, it is possible to provide a composition for non-aqueous secondary battery functional layer capable of forming a non-aqueous secondary battery function layer that may firmly bond together a separator and an electrode in electrolysis solution while exerting a protection function without causing reductions in battery characteristics.

"Density" as used herein refers to a true density of particles, which is a value measured using a gas displacement method.

"Degree of swelling in electrolysis solution" of the core and shell of organic particles referred to herein can be measured using the measurement method described in the Examples of this disclosure.

The percentage of the blending amount of the non-conductive inorganic particles in the composition disclosed herein for non-aqueous secondary battery functional layer relative to the total blending amount of the non-conductive inorganic particles and the organic particles is preferably greater than 50% by mass to 98% by mass When the percentage of the blending amount of the non-conductive inorganic particles relative to the total blending amount of the non-conductive inorganic particles and the organic particles falls within the above range, a non-aqueous secondary battery function layer that can attain high levels of both protection function and adhesion function can be provided.

The composition disclosed herein for non-aqueous secondary battery function layer preferably has a viscosity of 1 mPa·s to 100 mPa·s. When the composition has a viscosity that falls within the above range, it is possible for a functional layer for a non-aqueous secondary battery formed using the composition to exert high adhesion.

"Viscosity" as used herein refers to a value measured using a B-type viscometer at 25° C. and at a rotational speed of 60 rpm.

This disclosure is aimed at advantageously solving the aforementioned problem. The non-aqueous secondary battery function layer disclosed herein is formed by applying on a substrate the composition for non-aqueous secondary battery functional layer described above and drying the composition applied. Using a composition containing the specific organic particles described above and non-conductive inorganic particles having a 1.5 g/cm$^3$ or higher density than the organic particles as described above, a functional layer for non-aqueous secondary battery that can firmly bond together a separator and an electrode in electrolysis solution while exerting a protection function and that can allow a non-aqueous secondary battery to exert high battery characteristics can be produced at high production efficiency.

The above-described functional layer disclosed herein for non-aqueous secondary battery shows adhesion in electrolysis solution, and constitutes for example a part of a separator by being formed on a separator substrate. The functional layer disclosed herein for non-aqueous secondary battery exerts good adhesion when a separator including a separator substrate and the functional layer for non-aqueous secondary battery is bonded to an electrode in a non-aqueous secondary battery.

This disclosure is aimed at advantageously solving the aforementioned problem. The non-aqueous secondary battery disclosed herein includes a separator provided with the functional layer for non-aqueous secondary battery described above, and an electrode. Thus, using the functional layer for non-aqueous secondary battery described above, a non-aqueous secondary battery that exhibits superior adhesion between the separator and electrode in electrolysis solution as well as superior battery characteristics can be provided at high production efficiency.

Advantageous Effect of Invention

According to this disclosure, it is possible to provide a composition for non-aqueous secondary battery functional layer that can form a functional layer for non-aqueous secondary battery that can exert protection function and adhesion function with a single layer and may firmly bond together an electrode and a separator in electrolysis solution while ensuring battery characteristics. According to this disclosure, it is also possible to provide a functional layer for non-aqueous secondary battery that can exert both protection function and adhesion function with a single layer and can firmly bond together battery members in electrolysis solution while ensuring battery characteristics. According to this disclosure, it is also possible to provide a non-aqueous secondary battery that includes the functional layer for non-aqueous secondary battery and exhibits superior battery characteristics and productivity.

BRIEF DESCRIPTION OF THE DRAWINGS

In the accompanying drawings:
FIG. 1 is a cross-sectional view schematically illustrating a structure of an example of an organic particle contained in a composition disclosed herein for non-aqueous secondary battery functional layer.

DETAILED DESCRIPTION

Embodiments of this disclosure will now be described in detail.

The composition disclosed herein for non-aqueous secondary battery functional layer is used as a material for preparing the functional layer disclosed herein for non-aqueous secondary battery. The functional layer disclosed herein for non-aqueous secondary battery is prepared using the composition disclosed herein for non-aqueous secondary battery functional layer and constitutes for example a part of a separator. The non-aqueous secondary battery disclosed herein includes at least the functional layer disclosed herein for non-aqueous secondary battery.

(Composition for Non-Aqueous Secondary Battery Functional Layer)

The composition for non-aqueous secondary battery functional layer is a slurry composition containing non-conductive inorganic particles and organic particles, and optionally contains a particulate polymer for functional layer and other component(s), wherein water or the like is used as a dispersion medium. The functional layer prepared using the composition disclosed herein for non-aqueous secondary battery functional layer can exert a function as a porous protection layer that increase heat resistance and strength of a separator or the like, as well as a function as an adhesive layer that firmly bonds together battery members, such as a separator and an electrode, in electrolysis solution.

<Non-Conductive Inorganic Particles>

The non-conductive inorganic particles contained in the composition for non-aqueous secondary battery functional layer are inorganic particles and therefore generally can increase heat resistance and strength of a functional layer. Preferred materials of the non-conductive inorganic particles are those that are present stably in the use environment of non-aqueous secondary batteries and have electrochemical stability, as well as capable of ensuring a specific difference in density between the non-conductive inorganic particles and organic particles described later. Preferred examples of materials of non-conductive inorganic particles chosen from such a perspective include particles of oxides such as aluminum oxide (alumina), hydrated aluminum oxide (boehmite (AlOOH)), gibbsite (Al(OH)$_3$), silicon oxide, magnesium oxide (magnesia), magnesium hydroxide, calcium oxide, titanium oxide (titania), barium titanate (BaTiO$_3$), ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. Of these inorganic materials, preferred are aluminum oxide, boehmite, barium sulfate, and barium titanate, with spherical, flat or plate-shaped aluminum oxide, boehmite, barium sulfate and barium sulfate being more preferred. These particles may be subjected to element replacement, surface treatment, solid solution treatment and/or the like where necessary.

The non-conductive inorganic particles may be used alone or in combination.

The term "spherical" as used in spherical particles herein refers to a degree of flatness of less than 0.45, the term "flat" as used in flat particles herein refers to a degree of flatness of 0.45 to less than 1.0, and the term "plate-shaped" used in plates-shaped particles refers to an aspect ratio of 5 or more.

The "degree of flatness" is a value obtained using the formula (a−b)/a, where a and b are the long radius and short radius of an ellipse or spheroid, respectively.

The non-conductive inorganic particles preferably have a volume-average particle diameter D50 of 0.1 μm or more, more preferably 0.2 μm or more, still more preferably 0.3 μm or more, preferably 1.0 μm or less, more preferably 0.9 μm or less, and still more preferably 0.8 μm or less. Using non-conductive inorganic particles having a such volume-average particle diameter D50, a functional layer that exerts superior protection function even with a small thickness can be obtained, so that the battery capacity can be increased.

"Volume-average particle diameter D50" refers to a particle diameter where the cumulative volume from the fine side amounts to 50% of the entire volume in a particle size distribution (volume basis) measured by laser diffraction.

The non-conductive inorganic particles need to have a higher density than organic particles described later, and the difference in density between the non-conductive inorganic particles and the organic particles (non-conductive inorganic particles' density—organic particles' density) needs to be 1.5 $g/cm^3$ or more. The difference in density between the non-conductive inorganic particles and the organic particles is preferably 2.0 $g/cm^3$ or more, more preferably 2.5 $g/cm^3$ or more, still more preferably 3.0 $g/cm^3$ or more, preferably 5.0 $g/cm^3$ or less, and more preferably 4.5 $g/cm^3$ or less. When the difference in density between the non-conductive inorganic particles and the organic particles is less than 1.5 $g/cm^3$, it results in failure to allow the functional layer formed using the functional layer composition to sufficiently exert high levels of adhesion in electrolysis solution. When the difference in density between the non-conductive inorganic particles and the organic particles is 4.5 $g/cm^3$ or less, it is possible for the functional layer formed using the functional composition to well maintain ion conductivity.

Although it remains elusive why high adhesion and high ion conductivity cannot be obtained when the difference in density between the non-conductive inorganic particles and the organic particles falls outside the above-described range, the reason is presumed to be as follows. Specifically, a functional layer formed using a functional layer composition containing non-conductive inorganic particles and organic particles exerts a protection function derived mainly from the non-conductive inorganic particles, and high adhesion in electrolysis solution derived mainly from the organic particles. Hence, in order for the functional layer to exert high adhesion, it is preferable that the organic particles be moderately localized on the front side of the functional layer by, for example, migration upon formation of the functional layer, rather than being uniformly present throughout the functional layer while mixed with the non-conductive inorganic particles. Thus, if the difference in density between non-conductive inorganic particles and organic particles is too small, it is assumed that during formation of a functional layer, the non-conductive inorganic particles and the organic particles do not separate from each other (i.e., the organic particles are not localized on the front side of the functional layer) resulting in failure to sufficiently provide high adhesion derived from the organic particles. On the other hand, if the difference in density between the non-conductive inorganic particles and the organic particles is too large, it is assumed that the non-conductive inorganic particles and the organic particles are excessively localized inside the functional layer resulting in failure to ensure space among the non-conductive inorganic particles localized on the rear side of the functional layer to cause reductions in ion conductivity.

The non-conductive inorganic particles may have any level of density so long as it is higher than the density of organic particles described later and the difference in density between the non-conductive inorganic particles and the organic particles is 1.5 $g/cm^3$ or more. The density of the non-conductive inorganic particles is preferably 3.0 $g/cm^3$ or more, preferably 7.0 $g/cm^3$ or less, and more preferably 6.5 $g/cm^3$ or less. If the density of the non-conductive inorganic particles is too low, there is a concern that the non-conductive inorganic particles and the organic particles do not sufficiently separate from each other in the function layer and thus the functional layer fails to exhibit sufficient adhesion to an electrode. On the other hand, if the density of the non-conductive inorganic particles is too high, there is a concern that the functional layer exhibits poor ion conductivity due to the presence of the non-conductive inorganic particles localized inside the functional layer.

—Blending Amount of Non-Conductive Inorganic Particles—

The amount of the non-conductive inorganic particles in the functional layer composition is preferably set such that the percentage of the blending amount of the non-conductive inorganic particles relative to the total amount of the non-conductive inorganic particles and the organic particles falls within a specific range. Specifically, the percentage of the blending amount of the non-conductive inorganic particles relative to the total blending amount of the non-conductive inorganic particles and the organic particles is preferably greater than 50% by mass, more preferably 55% by mass or more, still more preferably 60% by mass or more, yet more preferably 65% by mass or more, particularly preferably 70% by mass or more, preferably 98% by mass or less, more preferably 97% by mass or less, still more preferably 95% by mass or less, and particularly preferably 90% by mass or less. By setting the percentage of the blending amount of the non-conductive inorganic particles to be at least any of the lower limit values of the above-described ranges, it is possible to allow the functional layer to exert high protection function (e.g., heat resistance). By setting the percentage of the blending amount of the non-conductive inorganic particles to be no greater than any of the upper limit values of the above-described ranges, it is possible to confer high adhesion and high ion conductivity to the functional layer.

<Organic Particles>

The organic particles contained in the composition for non-aqueous secondary battery functional layer are particles that serve in a functional layer as an adhesive that firmly bonds together battery members of a non-aqueous secondary battery, e.g., a separator substrate and an electrode. The organic particles each has a core-shell structure having a core and a shell partially covering the outer surface of the core, wherein the core is made of polymer having a degree of swelling in electrolysis solution of 5 times to 30 times, and the shell is made of polymer having a degree of swelling in electrolysis solution of greater than 1 time to 4 times.

Organic particles having the structure and properties described above exert superior adhesion in electrolysis solution and can well improve battery characteristics of a non-aqueous secondary battery provided with a functional layer. There are cases wherein battery members such as a separator used for the manufacture of a non-aqueous secondary battery are stored and transported in a spirally wound form. Battery members having the functional layer for non-aqueous secondary battery are less likely to undergo blocking (gluing of battery members to one another via functional layers) even when spirally wound and therefore are superior in handleability.

Although it remains elusive why the organic particles result in a superior effect such as that described above, the reason is presumed to be as follows.

Specifically, the shell polymer of the organic particle swells in contact with electrolysis solution. At this time, due for example to activation of the functional groups of the swollen polymer in the shell followed by chemical or electrical interactions with functional groups present on the surface of a battery member (e.g., separator substrate to be provided with a functional layer, or electrode to be bonded with a separator having a functional layer), the shell can be firmly bound to the battery member. Thus, it is presumed that a functional layer containing such organic particles enables battery members (e.g., separator and electrode) to be firmly bound to one another in electrolysis solution. For such a reason, it is also presumed that when a functional layer containing the organic particles is provided between a separator substrate and an electrode, the functional layer can provide firm adhesion between the separator substrate and the electrode in electrolysis solution.

Further, since the use of a functional layer containing the organic particles can provide firm adhesion between a separator substrate and an electrode in electrolysis solution as described above, in a secondary battery including such a functional layer, space is not easily formed between the battery members (e.g., between separator and electrode) bonded together with the functional layer. Thus, in a secondary battery including a functional containing the organic particles, the distance between the positive and negative electrodes does not easily increase, the internal resistance of the secondary battery can be lowered, and the reaction field of electrochemical reactions in the electrode does not easily become non-uniform. Further, in the secondary battery, space is not easily formed between the separator and electrode even after repeated cycles of charge and discharge, and thus the battery capacity does not easily decrease. It is assumed that this achieves superior bulging resistance and superior battery characteristics such as cycle characteristics.

Further, the core polymer of the organic particle greatly swells in contact with electrolysis solution. With the polymer greatly swollen in electrolysis solution, intermolecular space of the polymer becomes large allowing ions to easily pass through between the molecules. Also, the core polymer of the organic particle is not completely covered with the shell. Thus, ions are more likely to pass through the core in electrolysis solution, and therefore the organic particles can exert high ion diffusivity. Accordingly, using the organic particles described above, it is possible to suppress increases in resistance due to the functional layer to suppress reductions in battery characteristics such as low-temperature output characteristics.

When not swollen in electrolysis solution, the shell polymer does not generally exhibit adhesion but does so only after swollen in electrolysis solution. For this reason, the organic particles do not generally exert adhesion when they are not swollen in electrolysis solution. The functional layer containing the organic particles therefore does not exert great adhesion when not swollen in electrolysis solution, and it is assumed that a substrate such as a separator substrate provided with the functional layer does not easily undergo blocking even when stacked. It is not that the organic particles do not exert adhesion at all as long as they do not swell in contact with electrolysis solution; they may exert adhesion when, for example, heated to a given temperature or higher (e.g., 50° C. or higher).

[Structure of Organic Particle]

Each organic particle has a core-shell structure having a core and a shell that covers the outer surface of the core. The shell partially covers the outer surface of the core. Specifically, although the shell of the organic particle covers the outer surface of the core, it does not cover the entire outer surface of the core. Even when the core outer surface seems to be completely covered by a shell by its appearance, the shell is equated to a shell that partially covers the core outer surface in cases where the shell has a pore that communicates between inside and outside of the shell. Accordingly, the above-described organic particles encompass, for example, such organic particles with a shell having a fine pore that communicates from the shell outer surface (i.e., peripheral surface of the organic particle) to the core outer surface.

Specifically, referring to FIG. 1 which illustrates a cross-sectional structure of an example of an organic particle, an organic particle 100 has a core-shell structure having a core 110 and a shell 120. The core 110 refers to a portion which is present inward from the shell 120 in the organic particle 100. The shell 120 refers to a portion which covers an outer surface 110S of the core 110, and normally refers to an outermost portion of the organic particle 100. The shell 120 does not cover the entire outer surface 110S of the core 110, but partially covers the outer surface 110S of the core 110.

In the organic particles, the average ratio of shell coverage on the core outer surface (ratio of coverage) is preferably 10% or more, more preferably 30% or more, still more preferably 40% or more, and particularly preferably 60% or more, preferably 99.9% or less, more preferably 99% or less, still more preferably 95% or less, yet more preferably 90% or less, and particularly preferably 85% or less. By setting the average ratio of shell coverage on the core outer surface to fall within any of the above-described ranges, it is possible to establish a good balance between ion diffusivity and adhesion of the functional layer.

The average ratio of shell coverage on the core outer surface may be measured by the observation of the cross-sectional structures of organic particles. Specifically, measurements may be made by the method described below.

First, organic particles are fully dispersed in room temperature-curable epoxy resin and then embedded to form a block piece containing the organic particles. A thin slice of 80-200 nm thickness is then cut from the block piece using a microtome equipped with a diamond blade to prepare a measurement specimen. Thereafter, where necessary, the measurement specimen is subjected to dying treatment using, for example, ruthenium tetroxide or osmium tetroxide.

The measurement specimen is then loaded into a transmission electron microscope (TEM), and an image of cross-sectional structures of the organic particles is captured. The magnification of the electron microscope is preferably such that a cross-section of one organic particle is within the field of view. Specifically, the magnification is preferably on the order of 10,000×.

In the cross-sectional structure of a captured organic particle image, length D1 (circumferential length of core, corresponding to the core outer surface) and length D2 (length of a part where the core outer surface contacts the shell) are measured. Using lengths D1 and D2 measured, the ratio of shell coverage on the core outer surface of that organic particle (Rc) is calculated using the following Equation (1):

$$\text{Ratio of coverage } Rc(\%)=(D2/D1)\times 100 \tag{1}$$

The ratio of coverage (Rc) is measured for 20 or more organic particles, and an average the measured ratios of coverage is calculated to find an average ratio of shell coverage on the core outer surface (ratio of coverage).

Although the ratio of coverage (Rc) can be calculated manually based on cross-sectional structures of organic particles, calculation can be made using commercially available image analysis software. For example, "AnalySIS Pro" (Olympus Corporation) can be used as such commercially available image analysis software.

The organic particles preferably have a volume-average particle diameter D50 of 0.01 μm or more, more preferably 0.1 μm or more, still more preferably 0.3 μm or more, preferably 10 μm or less, more preferably 5 μm or less, and still more preferably 1 μm or less. By setting the volume-average particle diameter D50 of the organic particles to be at least any of the lower limit values of the above-described ranges, it is possible to increase adhesion of the functional layer, as well as to suppress rises in the internal resistance of the functional layer. By setting the volume-average particle diameter D50 to be no greater than any of the upper limit values of the ranges, it is possible to improve low-temperature output characteristics, as well as to increase adhesion between the electrode and separator bonded together with the functional layer.

The organic particles may have any density so long as it is lower than the density of the non-conductive inorganic particles described above and the difference in density between the non-conductive inorganic particles and the organic particles is 1.5 g/cm³ or more. The density of the organic particles is preferably 0.9 g/cm³ or more, more preferably 1.0 g/cm³ or more, preferably 1.30 g/cm³ or less, and more preferably 1.20 g/cm³ or less. If the density of the organic particles is too low, there is a concern that the functional layer exhibits poor ion conductivity due to the presence of the non-conductive inorganic particles localized inside the functional layer. If the density of the organic particles is too high, there is a concern that the non-conductive inorganic particles and the organic particles do not sufficiently separate from each other in the function layer and thus the functional layer fails to exhibit sufficient adhesion to an electrode.

The organic particles may each have optional component(s) other than the core and shell as long as such component(s) do not significantly compromise expected effects. Specifically, for example, the organic particle may have inside the core a portion made of different polymer than the core. By way of specific example, seed particles which were used when producing the organic particles by seed polymerization may remain inside the core. However, from the perspective that the organic particles can exert significant levels of expected effects, the organic particles preferably have only a core and a shell.

—Core—

The core of the organic particle is made of polymer having a specific degree of swelling in electrolysis solution. Specifically, the core polymer needs to have a degree of swelling in electrolysis solution of 5 times or more, preferably 6 times or more, and more preferably 7 times or more, and needs to have a degree of swelling in electrolysis solution of 30 times or less, preferably 25 times or less, and more preferably 20 times or less. By setting the degree of swelling in electrolysis solution of the core polymer to be at least any of the lower limit values of the above-described ranges, it is possible to increase adhesion of the functional layer in electrolysis solution. By setting the degree of swelling in electrolysis solution of the core polymer to be no greater than any of the upper limit values of the above-described ranges, it is possible to ensure battery characteristics such as cycle characteristics.

The electrolysis solution used for the measurement of the degree of swelling in electrolysis solution of the core polymer can be a solution which is obtained by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

The degree of swelling in electrolysis solution of the core polymer can be measured in a manner as specifically described below.

First, a polymer for the core of the organic particles is prepared. For example, a polymer is prepared which was obtained by a process similar to that used for the core formation in the preparation of the organic particles. A film is fabricated using the polymer thus prepared. For example, when the polymer is solid, it is dried at 25° C. for 48 hours and then shaped into a 0.5 mm thick film. Alternatively, when the polymer is solution or dispersion liquid such as latex, the solution or dispersion liquid is placed into a polytetrafluoroethylene petri dish and dried at 25° C. for 48 hours to prepare a 0.5 mm thick film.

Next, the film prepared as described above is cut into a 1 cm×1 cm square sheet to provide a test specimen. The weight (W0) of the test specimen is measured. Further, the test specimen is immersed into the electrolysis solution described above at 60° C. for 72 hours and taken out from the electrolysis solution. The electrolysis solution on the surface of the test specimen is wiped off, and the weight (W1) of the test specimen after immersion is measured.

Using weights W0 and W1, the degree of swelling S (fold) is calculated using the equation S=W1/W0.

An exemplary method of adjusting the degree of swelling in electrolysis solution of the core polymer is to properly select the type and amount of a monomer used for the production of the core polymer in consideration of the SP value of the electrolysis solution. In general, when a polymer has an SP value close to that of electrolysis solution, the polymer tends to swell in the electrolysis solution. On the other hand, when a polymer has an SP value far from that of electrolysis solution, the polymer tends to be less likely to swell in the electrolysis solution.

The SP value as used herein means a solubility parameter.

The SP value can be calculated using the method introduced in "Hansen Solubility Parameters A User's Handbook, 2nd Ed (CRCPress)".

Further, an SP value of an organic compound can be estimated based on the molecular structure of the organic compound. Specifically, SP values may be calculated using simulation software capable of calculation of SP values using the SMILE equation (e.g., "HSPiP" (http://www.hansen-solubility.com)). In this simulation software, SP values are calculated based on the theory described in "Hansen SOLUBILITY PARAMETERS A User's Handbook Second Edition, Charles M. Hansen."

The monomer used for the preparation of the core polymer may be appropriately selected from those that provide polymers whose degree of swelling in electrolysis solution falls within any of the above-described ranges. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxyl group-containing monomers, sulfonate group-containing monomers, phosphate group-containing monomers, and hydroxyl group-containing monomers; (meth)acrylic acid derivatives such as 2-hydroxyethyl methacrylate; (meth) acrylic acid ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. These monomers may be used alone or in combination at any ratio.

Of these monomers, preferred for the preparation of the core polymer are (meth)acrylic acid ester monomers and (meth)acrylonitrile monomers, with (meth)acrylic acid ester monomers being more preferred. Specifically, the core polymer preferably contains a (meth)acrylic acid ester monomer unit or a (meth)acrylonitrile monomer unit, and more preferably contains a (meth)acrylic acid ester monomer unit. This not only makes it easy to control the degree of swelling of polymer, but can further increase ion diffusivity of the functional layer containing the organic particles.

The total percentage of the (meth)acrylic acid ester monomer unit and the (meth)acrylonitrile monomer unit in the core polymer is preferably 50% by mass or more, more preferably 55% by mass or more, still more preferably 60% by mass or more, particularly preferably 70% by mass or more, preferably 100% by mass or less, more preferably 99% by mass or less, still more preferably 95% by mass or less, and particularly preferably 90% by mass or less. By setting the total percentage of the (meth)acrylic acid ester monomer unit and the (meth)acrylonitrile monomer unit to fall within any of the above-described ranges, the degree of swelling in electrolysis solution of the organic particles can be easily set to fall within any of the above-described ranges. Further, it is possible to increase ion diffusivity of the functional layer, and further to improve low-temperature output characteristic of a secondary battery.

The core polymer may contain an acid group-containing monomer unit. Examples of acid group-containing monomers include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of the phosphate group-containing monomers include 2-(meth)acryloyloxyethyl phosphate, methyl-2-(meth)acryloyloxyethyl phosphate, and ethyl-(meth) acryloyloxyethyl phosphate.

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferred, with monocarboxylic acids being more preferable, and (meth)acrylic acid being still more preferable.

These acid group-containing monomers may be used alone or in combination at any ratio.

The percentage of the acid group-containing monomer unit in the core polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within any of the above-described ranges, it is possible to increase dispersibility of the core polymer during preparation of organic particles, enabling a shell that partially covers the core outer surface to be easily formed on the core outer surface.

The core polymer preferably contains a cross-linkable monomer unit in addition to the monomer units described above. A cross-linkable monomer refers to a monomer that may form a cross-linked structure during or after polymerization by heating or by irradiation with energy beams. When the core polymer contains a cross-linkable monomer unit, the degree of swelling of the polymer can be easily set to fall within any of the above-described ranges.

Examples of the cross-linkable monomers include multi-functional monomers having two or more polymerizable groups. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. Of these monomers, from the perspective of easy control of the degree of swelling in electrolysis solution of the core polymer, di(meth)acrylic acid ester compounds and epoxy group-containing ethylenically unsaturated monomers are preferable, with di(meth)acrylic acid ester compounds being more preferable. These cross-linkable monomers may be used alone or in combination at any ratio.

In general, the degree of swelling in electrolysis solution of a polymer tends to decrease with increasing percentage of a cross-linkable monomer unit in that polymer. Accordingly, it is preferable to determine the percentage of a cross-linkable monomer unit in consideration of the type and amount of monomers used. The specific percentage of the cross-linkable monomer unit in the core polymer is preferably 0.1% by mass or more, more preferably 0.2% by mass or more, still more preferably 0.5% by mass or more, preferably 5% by mass or less, more preferably 4% by mass or less, and still more preferably 3% by mass or less. By setting the percentage of the cross-linkable monomer unit to be at least any of the lower limit values of the above-specified ranges, it is possible to increase adhesion of the functional layer. By setting the percentage of the cross-linkable monomer unit to be no greater than any of the upper limit values of the above-described ranges, it is possible to improve cycle characteristics of a secondary battery.

The core polymer preferably has a glass-transition temperature of 0° C. or higher, more preferably 30° C. or higher, still more preferably 50° C. or higher, yet more preferably 60° C. or higher, particularly preferably 80° C. or higher, preferably 150° C. or below, more preferably 130° C. or below, still more preferably 110° C. or below, and yet more preferably 100° C. or below. By setting the glass-transition temperature of the core polymer to be at least any of the lower limit values of the above-described ranges, it is possible to increase adhesion of the functional layer. By setting the glass-transition temperature of the core polymer to be no greater than any of the upper limit values of the above-described ranges, it is possible to prolong the life of a secondary battery. By setting the glass-transition temperature of the core polymer to fall within any of the above-described ranges, it is possible to improve low-temperature output characteristics of a secondary battery. The glass-transition temperature can be measured in accordance with JIS K7121.

—Shell—

The shell of the organic particle is made of polymer having a specific a degree of swelling in electrolysis solution which is smaller than that of the core. Specifically, the shell polymer needs to have a degree of swelling in electrolysis solution of greater than 1 time, preferably 1.05 times or more, more preferably 1.1 times or more, and still more preferably 1.2 times or more, and needs to have a degree of swelling in electrolysis solution of 4 times or less, preferably 3.5 times or less, more preferably 3 times or less, and still more preferably 2 times or less. By setting the degree of swelling in electrolysis solution of the shell polymer to fall within any of the above-described ranges, it is possible to increase adhesion of the functional layer in electrolysis solution. Accordingly, it is possible to reduce internal resistance of a secondary battery and therefore to well maintain its battery characteristics. By setting the degree of swelling in electrolysis solution of the shell polymer to be at least any of the lower limit values of the above-described ranges, it is possible to improve low-temperature output characteristics of a secondary battery. By setting the degree of swelling in electrolysis solution of the shell polymer to be no greater than any of the upper limit values of the above-described ranges, it is possible to increase adhesion of the functional layer.

The electrolysis solution used for the measurement of the degree of swelling in electrolysis solution of the shell polymer is the same as that used for the measurement of the degree of swelling in electrolysis solution of the core polymer.

The degree of swelling in electrolysis solution of the shell polymer can be measured in a manner as specifically described below.

First, a polymer for the shell of the organic particles is prepared. For example, a polymer is produced as in the production method of core by using, instead of a monomer composition for core, a monomer composition for shell in the preparation of the organic particles.

Thereafter, using the same method as that used for the measurement of the degree of swelling of the core, a film is prepared from the shell polymer, a test specimen is cut from the film, and the test specimen is measured for degree of swelling (S).

An exemplary method of adjusting the degree of swelling in electrolysis solution of the shell polymer is to properly select the type and amount of a monomer used for the production of the shell polymer in consideration of the SP value of the electrolysis solution.

The monomer used for the preparation of the shell polymer may be appropriately selected from those that provide polymers whose degree of swelling in electrolysis solution falls within any of the above-described ranges. Examples of such monomers include monomers similar to those exemplified above as monomers which may be used for the production of the core polymer. Such monomers may be used alone or in combination at any ratio.

Of these monomers, aromatic vinyl monomers are preferable as monomers used for the preparation of the shell polymer. Specifically, the shell polymer preferably contains an aromatic vinyl monomer unit. Among aromatic vinyl monomers, styrene and styrene derivatives such as styrene sulfonic acid are preferable. Aromatic vinyl monomers not only make it easy to control the degree of swelling in electrolysis solution of the polymer, but can further increase adhesion of the functional layer.

The percentage of the aromatic vinyl monomer unit in the shell polymer is preferably 20% by mass or more, more preferably 40% by mass or more, still more preferably 50% by mass or more, yet more preferably 60% by mass or more, particularly preferably 80% by mass or more, preferably 100% by mass or less, more preferably 99.5% by mass or less, and still more preferably 99% by mass or less. By setting the percentage of the aromatic vinyl monomer unit to fall within any of the above-described ranges, the degree of swelling in electrolysis solution of the shell can be easily set to fall within any of the above-described ranges. Further, it is possible to further increase adhesion of the functional layer in electrolysis solution.

The shell polymer may contain an acid group-containing monomer unit, other than the aromatic vinyl monomer unit. Examples of acid group-containing monomers include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of the phosphate group-containing monomers include 2-(meth)acryloyloxyethyl phosphate, methyl-2-(meth)acryloyloxyethyl phosphate, and ethyl-(meth)acryloyloxyethyl phosphate.

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferable, with monocarboxylic acids being more preferable, and (meth)acrylic acid being still more preferable.

These acid group-containing monomers may be used alone or in combination at any ratio.

The percentage of the acid group-containing monomer unit in the shell polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within any of the above-described ranges, it is possible to improve dispersibility of the organic particles in the functional layer allowing good adhesion to be exerted over the entire surface of the functional layer.

The shell polymer may contain a cross-linkable monomer unit. Examples of cross-linkable monomers include monomers similar to those exemplified above as cross-linkable monomers which may be used for the production of the core polymer. These cross-linkable monomers may be used alone or in combination at any ratio.

The percentage of the cross-linkable monomer unit in the shell polymer is preferably 0.1% by mass or more, more preferably 0.2% by mass or more, still more preferably 0.5% by mass or more, preferably 5% by mass or less, more preferably 4% by mass or less, and still more preferably 3% by mass or less.

The shell polymer preferably has a glass-transition temperature of 50° C. or higher, more preferably 80° C. or higher, still more preferably 90° C. or higher, preferably 200° C. or below, more preferably 180° C. or below, still more preferably 150° C. or below, and particularly preferably 120° C. or below. By setting the glass-transition temperature of the shell polymer to be at least any of the lower limit values of the above-described ranges, it is possible to suppress the occurrence of blocking of the functional layer, as well as to further improve low-temperature output characteristics of a secondary battery. By setting the glass-transition temperature of the shell polymer to be no greater than any of the upper limit values of the above-specified ranges, it is possible to further increase adhesion of the functional layer in electrolysis solution. By setting the glass-transition temperature of the shell polymer to fall within any of the above-described ranges, it is further possible to improve cycle characteristics of a secondary battery.

The shell preferably has an average thickness that falls within a specific range in percentage relative to the volume-average particle diameter D50 of the organic particles. Specifically, the average shell thickness in percentage relative to the volume-average particle diameter D50 of the organic particles (core-shell ratio) is preferably 1.5% or more, more preferably 2% or more, and still more preferably 5% or more, preferably 30% or less, more preferably 25% or less, and still more preferably 20% or less. By setting the average shell thickness to be at least any of the lower limit values of the above-described ranges, it is possible to further increase adhesion of the functional layer. By setting the average shell thickness to be no greater than any of the upper limit values of the above-described ranges, it is possible to further improve low-temperature output characteristics of a secondary battery.

The average shell thickness can be obtained by the observation of cross-sectional structures of organic particles by transmission electron microscopy (TEM). Specifically, the maximum shell thickness in a cross-sectional structure of an organic particle is measured by TEM. 20 or more randomly-selected organic particles are measured for their maximum shell thickness, and an average of the measured maximum thicknesses is recorded as an average shell thickness. However, in the case that the shell is composed of polymer particles and these polymer particles are arranged in a monolayer without being stacked on top of one another in the radial direction of the organic particle, the number-average particle diameter of the polymer particles is recorded as an average shell thickness.

Although the shell may take any form, it is preferably composed of polymer particles. When the shell is composed of polymer particles, these shell particles may be stacked on top of one another in the radial direction of the organic particle. However, shell particles are preferably arranged in a monolayer to constitute a shell without being stacked on top of one another in the radial direction of the organic particle.

[Preparation Method of Organic Particles]

Organic particles having the core-shell structure described above can be prepared for example by stepwise polymerization of monomers for core and shell polymers with the ratios of these monomers being changed over time. Specifically, the organic particles can be prepared by continuous, multi-stage emulsion polymerization or multi-stage suspension polymerization wherein, e.g., a polymer produced in a previous stage is sequentially covered with a polymer produced in a later stage.

By way of example, the following describes an exemplary case where organic particles having the core-shell structure described above are obtained by multi-stage emulsion polymerization.

For polymerization, as emulsifiers, anionic surfactants such as sodium dodecylbenzene sulfonate and sodium dodecyl sulfonate; nonionic surfactants such as polyoxyethylene nonylphenyl ether and sorbitan monolaurate; or cationic surfactants such as octadecylamine acetate can be used in accordance with a common procedure. As polymerization initiators, peroxides such as t-butyl peroxy-2-ethylhexanoate, potassium persulfate and cumene peroxide; or azo compounds such as 2,2'-azobis(2-methyl-N-(2-hydroxyethyl)-propionamide), and 2,2'-azobis(2-amidinopropane) hydrochloride can be used.

The polymerization procedure is as follows: A monomer for core and an emulsifier are first mixed, and batch emulsion polymerization of the monomer is effected to yield a particulate core polymer. Polymerization of a monomer for shell is then effected in the presence of this particulate core polymer to afford organic particles having the core-shell structure described above.

At this time, from the perspective of achieving partial shell coverage on the core outer surface, the monomer for shell polymer is preferably supplied to the polymerization system either multiples times in divided portions or continuously. By supplying the monomer for shell polymer to the polymerization system either multiple times in divided portions or continuously, a shell polymer is produced in particulate form and this particle binds to a core. In this way, a shell that partially covers a core can be formed.

When the monomer for shell polymer is supplied multiple times in divided portions, it is possible to control the particle diameters of shell particles and the average shell thickness according to the number of divided portions. When the monomer for shell polymer is supplied continuously, it is possible to control the particle diameters of shell particles and the average shell thickness by adjusting the amount of the monomer supplied per unit time.

The volume-average particle diameter D50 of organic particles after shell formation can be set to fall within a desired range for example by the adjustment of the amounts of emulsifier and monomer, for example.

Further, the average ratio of shell coverage on the core outer surface can be set to fall within a desired range for example by the adjustment of the amount of emulsifier and the amount of the monomer for the shell polymer correspondingly with the volume-average particle diameter D50 of the particulate core polymer.

<Particulate Polymer for Functional Layer>

As described above, the organic particles do not normally exert adhesion when not swollen in electrolysis solution. Thus, from the perspective of preventing the components contained in the functional layer from coming off the functional layer prior to immersion into electrolysis solution, as a binder, it is preferable to use a particulate polymer for functional layer in combination, which exerts higher adhesion than the organic particles in an environment of 25° C. where the organic particles are not swollen in the electrolysis solution. The use of a particulate polymer for functional layer can prevent components such as non-conductive inorganic particles from coming off both when the organic particles are swollen in electrolysis solution and when they are not swollen in electrolysis solution.

Examples of particulate polymers for functional layer which may be used in combination with the organic particles include water-insoluble particulate polymers known in the art which are dispersible into dispersion media such as water; specific examples thereof include thermoplastic elastomers. Of thermoplastic elastomers, preferred are conjugated diene-based polymers and acrylic polymers, with acrylic polymers being more preferred.

The term "conjugated diene-based polymer" refers to a polymer containing a conjugated diene monomer unit. Specific examples of conjugated diene-based polymers include polymers containing an aromatic vinyl monomer unit and an aliphatic conjugated diene monomer unit, such as styrene-butadiene copolymer (SBR). The term "acrylic polymer" refers to a polymer containing a (meth)acrylic acid ester monomer unit.

These particulate polymers for functional layer may be used alone or in combination. It should be noted that when two or more different particulate polymers for functional layer are used in combination, these polymers are different from organic particles having a core-shell structure which is made of polymers having the specific degrees of swelling in electrolysis solution described above.

Acrylic polymers as particulate polymers for functional layer preferably contain a (meth)acrylonitrile monomer unit. This makes it possible to increase strength of the functional layer.

In an acrylic polymer as a particulate polymer for functional layer, the percentage of the amount of the (meth)acrylonitrile monomer unit relative to the total amount of the (meth)acrylonitrile monomer unit and (meth)acrylic acid ester monomer unit is preferably 1% by mass or more, more preferably 5% by mass or more, preferably 30% by mass or less, and more preferably 25% by mass or less. By setting the percentage of the amount of the (meth)acrylonitrile monomer unit to be at least any of the lower limit values of the ranges described above, it is possible to increase strength of the acrylic polymer as a particulate polymer for functional layer, and thus to enhance strength of the functional layer containing the acrylic polymer. By setting the percentage of the amount of the (meth)acrylonitrile monomer unit to be no greater than any of the upper limit values of the ranges described above, the acrylic polymer as a particulate polymer for functional layer moderately swells in electrolysis solution, so that it is possible to suppress reductions in ion conductivity of the functional layer and reductions in low-temperature output characteristics of a secondary battery.

The polymer as a particulate polymer for functional layer preferably has a glass-transition temperature of −50° C. or higher, and preferably 25° C. or below. By setting the glass-transition temperature of the polymer as a particulate polymer for functional layer to be at least the lower limit value of the range described above, it is possible to increase adhesion of the functional layer prior to immersion into electrolysis solution. By setting the glass-transition temperature to be no greater than the upper limit value of the range described above, it is possible to increase flexibility of the functional layer.

The particulate polymer for functional layer preferably has a volume-average particle diameter D50 of 0.1 μm to 0.5 μm. By setting the volume-average particle diameter D50 of the particulate polymer for functional layer to be at least the lower limit value of the range described above, it is possible to increase dispersibility of the particulate polymer for functional layer. By setting the volume-average particle diameter D50 to be no greater than the upper limit value of the range described above, it is possible to increase adhesion of the functional layer.

The amount of the particulate polymer for functional layer contained in the functional layer composition is preferably 0.1 parts by mass or more, more preferably 0.2 parts by mass or more, preferably 30 parts by mass or less, and more preferably 20 parts by mass or less per 100 parts by mass of the total amount of the non-conductive inorganic particles and the organic particles. By setting the amount of the particulate polymer for functional layer to be at least any of the lower limit values of the ranges described above, it is possible to sufficiently prevent the non-conductive inorganic particles and the organic particles from coming off the functional layer, as well as to increase adhesion between the functional layer and substrate. By setting the amount of the particulate polymer for functional layer to be no greater than any of the upper limit values of the ranges described above, it is possible to suppress reductions in ion diffusivity of the functional layer.

Examples of methods of producing the particulate polymer for functional layer include solution polymerization, suspension polymerization, and emulsion polymerization. Of these polymerization methods, preferred are emulsion polymerization and suspension polymerization because polymerization can be effected in water and therefore a water dispersion containing a particulate polymer can be suitably directly used as a material for the functional layer composition. Upon production of a polymer as a particulate polymer for functional layer, the reaction system preferably contains a dispersant. In general, the particulate polymer for functional layer is substantially formed of a polymer that constitutes that particulate polymer. However, the particulate polymer may also have optional component(s) such as additives which were used for polymerization.

<Additional Components>

The composition for non-aqueous secondary battery functional layer may contain optional additional component(s) in addition to the components described above. Any of the additional components known in the art can be used so long as the battery reactions are not affected. These additional components may be used alone or in combination.

Examples of the additional components include additives known in the art, such as viscosity modifiers, wetting agents, and additives for electrolysis solution.

[Viscosity Modifier]

Any viscosity modifier can be used so long as it may be dissolved in dispersion media such as water to modify the viscosity of the functional layer composition. Examples of viscosity modifiers include water-soluble polymers such as: natural polymers such as xanthan gum, dextran, succinoglucan, and bluran; semi-synthetic polymers such as cellulose sulfate sodium, methyl cellulose, methyl ethyl cellulose, ethyl cellulose, carboxymethyl cellulose (CMC), and salts thereof; and synthetic polymers such as polyacrylic acid salts, polyvinyl alcohols, polyethylene oxides, polyvinylpyrrolidones, copolymers of acrylic acid or acrylic acid salts with vinyl alcohol, fully or partially saponified copolymers of maleic anhydride (or maleic acid) or fumaric acid with vinyl acetate, modified polyvinyl alcohols, modified polyacrylic acids, polyethylene glycols, polycarboxylic acids, polyacrylamides, ethylene-vinyl alcohol copolymers, and vinyl acetate polymers. Of these water-soluble polymers, preferred are xanthan gum, carboxymethyl cellulose and polyacrylamides from the perspective of conferring heat resistance to the functional layer so as to suppress thermal shrinkage of a substrate such as a separator substrate.

The amount of the viscosity modifier contained in the functional layer composition is preferably 0.2 parts by mass to 2.0 parts by mass per 100 parts by mass of the total amount of the non-conductive inorganic particles and the organic particles. By setting the amount of the viscosity modifier to be at least the lower limit value of the range described above, the functional layer composition can have a moderate level of viscosity, so that components such as non-conductive inorganic particles can be well dispersed in the functional layer composition. By setting the amount of the viscosity modifier to be no greater than the upper limit value of the range described above, the organic particles and non-conductive inorganic particles can be moderately localized for example by migration during the formation of the functional layer, allowing the functional layer to exert high adhesion.

<Preparation Method of Composition for Non-Aqueous Secondary Battery Functional Layer>

Any method can be employed for the preparation of the functional layer composition. The functional layer composition is normally prepared by mixing together the non-conductive inorganic particles and organic particles described above, water as a dispersion medium, and optionally a particulate polymer for functional layer and additional component(s) which are used where necessary. Any method can be used for mixing. For efficient mixing of the components, mixing is normally performed using a dispersing device as a mixing device.

The dispersing device is preferably capable of uniformly dispersing and mixing the components described above. Examples of the dispersing device include ball mill, sand mill, pigment disperser, grinding machine, ultrasonic disperser, homogenizer, and planetary mixer. For their ability to apply a high dispersing shear force, high-dispersing devices such as bead mill, roll mill, and FILMIX can also be exemplified.

The resultant composition for non-aqueous secondary battery functional layer preferably has a viscosity of 1 mPa·s or more, more preferably 5 mPa·s or more, still more preferably 10 mPa·s or more, particularly preferably 15 mPa·s or more, preferably 100 mPa·s or less, more preferably 90 mPa·s or less, still more preferably 60 mPa·s or less, and particularly preferably 50 mPa·s or less. When the viscosity of the functional layer composition is 1 mPa·s or more, it is possible to well disperse the components such as the non-conductive inorganic particles in the functional layer composition. When the viscosity of the functional layer composition is 100 mPa·s or less, the organic particles and non-conductive inorganic particles can be moderately localized for example by migration during the formation of the functional layer, allowing the functional layer to exert high adhesion derived from the organic particles.

(Functional Layer for Non-Aqueous Secondary Battery)

The functional layer for non-aqueous secondary battery can be formed on a proper substrate using the composition for non-aqueous secondary battery functional layer described above. The functional layer for non-aqueous secondary battery can exert a function as a protection film that increase heat resistance and strength of a battery member provided with the functional layer, as well as a function as an adhesive layer that firmly bonds together battery members of a non-aqueous secondary battery, such as a separator substrate and an electrode, in electrolysis solution.

An exemplary method of forming a functional layer on a substrate using the functional layer composition involves applying the functional layer composition onto a proper substrate to form a coating film, and drying the coating film to form a functional layer. The functional layer formed on the substrate can be used in any way: the functional layer may be formed for example on a separator substrate to manufacture a battery member such as a separator; the functional layer may be formed on an electrode; the functional layer formed on a releasable substrate may be once separated from the substrate and then bonded to another substrate to manufacture a battery member; and so forth.

However, from the perspective of increasing the manufacturing efficiency of a battery member by not performing the step of separating a releasable substrate from the functional layer, it is preferable to use a separator substrate or the like as a substrate. The functional layer provided on a separator substrate can be suitably used as a single layer that simultaneously exerts a function as a protection film that increases heat resistance and strength of a separator, and a function as an adhesive layer that firmly bonds together a separator and an electrode particularly in electrolysis solution.

A separator that includes a separator substrate and the functional layer for non-aqueous secondary battery formed on the separator substrate (functional layer-attached separator) can be manufactured in fewer steps and in less time than the conventional separator having a protection layer and an adhesive layer, and therefore has high productivity. Further, the separator that includes a separator substrate and the functional layer for non-aqueous secondary battery utilizes specific organic particles to exert adhesion and therefore can allow a non-aqueous secondary battery to exert high battery characteristics compared to the conventional separator having a protection layer and an adhesive layer.

The functional layer may be formed only on one side or both sides of a separator substrate. Using a separator having a functional layer only on one side of the separator substrate, it is possible to manufacture a secondary battery wherein the positive electrode and separator, or the negative electrode and separator, are firmly bonded together with the functional layer in electrolysis solution. Further, using a separator having a functional layer on both sides of a separator substrate, it is possible to manufacture a secondary battery wherein the positive electrode, separator and negative electrode are firmly bonded together with the functional layers in electrolysis solution.

The functional layer disclosed herein for non-aqueous secondary battery normally shows adhesion in electrolysis solution. Specifically, the peel strength measured as follows is normally 1 N/m or more, preferably 2 N/m or more, and more preferably 3 N/m or more. For example, a functional layer whose conditions are shown in Table 1 is formed on a separator substrate whose conditions are shown in Table 1 to manufacture a functional layer-attached separator, and a negative-electrode mixed material layer of a negative electrode whose conditions are shown in Table 1 is aligned with the surface of the functional layer and pressed for 10 seconds at 80° C. under a pressure of 0.5 MPa to manufacture a laminate. Using a method similar to that used in Examples, in electrolysis solution whose conditions are shown in Table 1, the laminate is then evaluated for peel strength between the functional layer-attached separator and negative electrode as an evaluation of adhesion.

When the functional layer for non-aqueous secondary battery shows adhesion in electrolysis solution as described above, it is possible for a secondary battery having such a functional layer to suppress cell bulging and reductions in battery characteristics, which are associated with poor adhesion between battery members in electrolysis solution.

TABLE 1

| | |
|---|---|
| Condition for separator substrate | Material: polyethylene<br>Porous (Gurley number: 150 to 250 sec/100 cc)<br>Separator substrate thickness: 10 to 20 μm |
| Condition for functional layer | Manufactured through at least the following steps:<br>(1) adjust the solid content concentration of the functional layer composition to 10% by mass<br>(2) apply the functional layer composition onto the separator substrate using comma coater<br>(3) dry 3 min in 50° C. oven<br>Functional layer thickness: 5 μm |
| Condition for negative electrode | Current collector: copper foil, 20 μm thick<br>Negative electrode mixed material layer: produced from slurry composition containing the following components:<br>Negative electrode active material: synthetic graphite (volume-average particle diameter D50: 10 to 20 μm)<br>Other components<br>1.5 parts by mass of SBR as binder and<br>1 part by mass of sodium salt of carboxy methyl cellulose as viscosity modifer per 100 part by mass of negative electrode active material<br>Manufactured through at least the following steps:<br>(1) adjust the solid content concentration of the slurry composition to 52% by mass<br>(2) apply the slurry composition onto the current collector using comma coater<br>(3) dry 2 min in 60° C. oven<br>(4) roll at 120° C. for 2 min using roll press<br>Negative electrode mixed material layer thickness: 80 μm |
| Condition for electrolysis solution | Solvent:<br>Ethylene carbonate: 68.5% by volume<br>Diethyl carbonate: 30.0% by volume<br>Vinylene carbonate: 1.5% by volume<br>Supporting electrolyte: 1 mol/L LiPF$_6$ in solvent |

(Non-Aqueous Secondary Battery)

The non-aqueous secondary battery disclosed herein includes a separator provided with the functional layer for non-aqueous secondary battery described above, and an electrode. Specifically, the non-aqueous secondary battery disclosed herein includes a positive electrode; a negative electrode; a separator that includes a separator substrate and the functional layer for non-aqueous secondary battery described above formed on the separator substrate (functional layer-attached separator); and electrolysis solution. In the non-aqueous secondary battery disclosed herein, the positive electrode and separator, and/or, the negative separator and separator are firmly bonded together in electrolysis solution by means of the functional layer for non-aqueous secondary battery, so that increases in interelectrode distance associated with repeated cycles of charge and discharge are suppressed resulting in good battery characteristics such as cycle characteristics. In the non-aqueous secondary battery disclosed herein, the separator exhibits increased heat resistance and strength by means of the functional layer for non-aqueous secondary battery. Further, compared to cases where the conventional separator having a protection layer and an adhesive layer is used, the non-aqueous secondary battery disclosed herein can be manufactured at high productivity by shortening the time required for separator manufacture.

The positive electrode, negative electrode, separator substrate and electrolysis solution described above can be those known in the art which are used in non-aqueous secondary batteries.

Specifically, the electrodes (positive electrode and negative electrode) can be formed of a current collector and an electrode mixed material layer formed on the current collector. The current collector may be made of a metal material such as iron, copper, aluminum, nickel, stainless steel, titan, tantalum, gold, and platinum. Of these metal materials, the current collector for the negative electrode is preferably made of copper. Further, the current collector for positive electrode is preferably made of aluminum. The electrode mixed material layer can be a layer including an electrode active material and a binder.

The electrolysis solution can be normally an organic electrolysis solution obtained by dissolving a supporting electrolyte into an organic solvent. For example, when the non-aqueous secondary battery is a lithium ion secondary battery, a lithium salt is used as the supporting electrolyte. For example, when the non-aqueous secondary battery is a lithium ion secondary battery, a lithium salt is used as the supporting electrolyte. Examples of lithium salts include LiPF$_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, and (C$_2$F$_5$SO$_2$)$_2$NLi. Of these lithium salts, LiPF$_6$, LiClO$_4$, and CF$_3$SO$_3$Li are preferable in that they easily dissolve in solvent and exhibit a high degree of dissociation, with LiPF$_6$ being particularly preferable. Electrolytes may be used alone or in combination at any ratio. Normally, the lithium ion conductivity tends to increase as a supporting electrolyte with a higher degree of dissociation is used. Therefore, the lithium ion conductivity can be adjusted by the type of supporting electrolyte.

Any organic solvent that can dissolve the supporting electrolyte may be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Among these solvents, carbonates are preferable for their high dielectric constant and broad stable potential region, and a mixture of ethylene carbonate and ethyl methyl carbonate is more preferable.

The concentration of the electrolyte in the electrolysis solution can be adjusted as needed. For example, the concentration is preferably 0.5% to 15% by mass, more preferably 2% to 13% by mass, and still more preferably 5% to 10% by mass. Any additive known in the art may be added to the electrolysis solution, such as fluoroethylene carbonate or ethyl methyl sulfone.

Any separator substrate can be used; for example, those described in JP2012204303A can be used. Of these separator substrates, fine porous membranes made of polyolefinic (i.e., polyethylene, polypropylene, polybutene, or polyvinyl chloride) resin are preferable for their ability to reduce total separator thickness thus increasing the ratio of the electrode active material in the secondary battery and consequently increasing the capacity per volume.

<Method of Manufacturing Non-Aqueous Secondary Battery>

The non-aqueous secondary battery disclosed herein can be manufactured for example by stacking a positive electrode and a negative electrode with a separator having the above-described functional layer for non-aqueous secondary battery provided therebetween, winding or folding the resulting laminate as necessary in accordance with the battery shape, placing it in a battery container, filling the battery container with an electrolysis solution, and sealing the container. To prevent an internal pressure rise in the non-aqueous secondary battery and the occurrence of overcharge/overdischarge and other events, the non-aqueous secondary battery may include, for example, an overcurrent preventing device such as a fuse or a PTC device; expanded metal; and/or a lead plate. The secondary battery may take any shape, such as coin, button, sheet, cylindrical, square or flat shape.

The above-described embodiment of this disclosure is directed to a case where a functional layer is provided on a separator substrate. The functional layer disclosed herein may be provided on an electrode. This embodiment also provides effects similar to those provided when the functional layer is provided on a separator substrate.

EXAMPLES

Hereinafter, the disclosed products and methods will be specifically described with reference to Examples; however, the disclosure is not limited to the Examples. In the following, "%" and "parts" used to express quantities are by mass, unless otherwise specified.

In a polymer produced by copolymerization of more than one monomer, the percentage of a structural unit formed by polymerization of a monomer in the polymer is consistent with the proportion (blending ratio) of the monomer in the total monomers used for the polymerization of the polymer, unless otherwise indicated.

In Examples and Comparative Examples, the degree of swelling in electrolysis solution of organic particle polymers; the average ratio of shell coverage on the outer core surface of an organic particle (ratio of coverage); the average shell thickness of organic particles (core-shell ratio); the volume-average particle diameters D50 of particles (non-conductive inorganic particles, organic particles, and particulate polymer for functional layer); the densities of non-conductive inorganic particles and organic particles; the glass-transition temperatures of polymers (core polymer, shell polymer, and particulate polymer for functional layer); the viscosity of a functional layer composition; the ion conductivity of a functional layer; heat resistance of a functional layer-attached separator; peel strength between the functional layer-attached separator and electrode; and low-temperature output characteristics, bulging resistance, and cycle characteristics of a secondary battery were measured and evaluated by the methods described below.

<Degree of Swelling in Electrolysis Solution of Organic Particle Polymers>

Using monomer compositions used for the preparation of the core and shell of the organic particles, water dispersions of polymers (for core and for shell) as measurement specimens were prepared using a polymerization condition similar to that used for the core and the shell.

Next, the water dispersions thus obtained were each placed in a polytetrafluoroethylene petri dish and dried at 25° C. for 48 hours to manufacture a 0.5 mm thick film. Each obtained film was cut into a 1 cm×1 cm square sheet to provide a test specimen. The weight (W0) of the test specimen was measured. The test specimen was immersed into electrolysis solution at 60° C. for 72 hours. The test specimen was then taken out from the electrolysis solution, the electrolysis solution on the surface of the test specimen was wiped off, and the weight (W1) of the test specimen after immersion was measured. Using weights W0 and W1, the degree of swelling S (fold) was calculated based on the equation S=W1/W0.

The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

<Average Ratio of Shell Coverage on Outer Core Surface of Organic Particle (Ratio of Coverage)>

Organic particles were fully dispersed in visible light-curable epoxy resin ("D-800" from JEOL Ltd.) and then embedded to form a block piece containing the organic particles. A thin slice of 100 nm thickness was then cut from the block piece using a microtome equipped with a diamond blade to prepare a measurement specimen. Thereafter, the measurement specimen was subjected to dying treatment using ruthenium tetroxide. The dyed measurement specimen was then loaded into a transmission electron microscope ("JEM-3100F" from JEOL Ltd.), and an image of a cross-sectional structure of a particulate polymer was captured at an acceleration voltage of 80 kV. The magnification of the electron microscope was set such that a cross-section of one organic particle was within the field of view. In the cross-sectional structure of the captured organic particle, length D1 (circumferential length of the core) and length D2 (length of a part where the core outer surface contacts the shell) were measured, and the ratio of shell coverage on the core outer surface of that organic particle (Rc) was calculated using the following Equation (1):

$$\text{Ratio of coverage } Rc \ (\%) = (D2/D1) \times 100 \quad (1).$$

The ratio of coverage (Rc) was measured for 20 randomly-selected organic particles, and an average was calculated. The calculated average was recorded as an average ratio of shell coverage on the core outer surface (ratio of coverage).

<Average Shell Thickness (Core-Shell Ratio) of Organic Particle>

The average shell thickness of organic particles was measured through the procedure described below. When the shell is composed of polymer particles, a cross-sectional structure of an organic particle was observed by transmission electron microcopy as in the measurement of the coverage ratio described above. From the cross-sectional structure of the organic particle observed, the maximum diameter of shell polymer particles was then measured. 20 randomly-selected organic particles were measured for their maximum diameter of shell polymer particles, and an average of the maximum diameters was recorded as an average shell thickness. When the shell has a shape other than particulate shape, a cross-sectional structure of an organic particle was observed by transmission electron microcopy as in the measurement of the coverage ratio described above. From the cross-sectional structure of the organic particle observed, the maximum shell thickness was measured. 20 randomly-selected organic particles were measured for their maximum shell thickness, and an average of the maximum shell thicknesses was recorded as an average shell thickness. The core-shell ratio (unit: %), which represents the ratio of average shell thickness to volume-average particle diameter D50 of organic particles, was then calculated by dividing the measured average shell thickness by the volume-average particle diameter D50 of the organic particles for evaluation of average shell thickness.

<Volume-Average Particle Diameter D50 of Particles>

The volume-average particle diameters of particles (non-conductive inorganic particles, organic particles, and particulate polymer for functional layer) were each recorded as a particle diameter where the cumulative volume from the fine side amounts to 50% of the entire volume in a particle size distribution measured by a laser diffraction particle size analyzer ("SALD-3100" from Shimadzu Corporation).

<Densities of Non-Conductive Inorganic Particles and Organic Particles>

The densities of non-conductive inorganic particles and organic particles were measured based on a gas displacement method using a dry automatic densitometer (AccuPyc II 1340, from Shimadzu Corporation).

<Glass-Transition Temperatures of Core Polymer, Shell Polymer, and Particulate Polymer for Functional Layer>

Using monomer compositions used for the preparation of these polymers, water dispersions of polymers as measurement specimens were prepared using polymerization conditions similar to those used for the polymers.

Next, a DSC curve was measured on a differential scanning calorimeter ("EXSTAR DSC6220" from SIT Nano-Technology Inc.) at standard temperature and standard humidity in the measurement temperature range of $-100°$ C. to $500°$ C. at a heating rate of $10°$ C./min, where 10 mg of dried sample specimen was weighed into an aluminum pan, and an empty aluminum pan was used as a reference. The glass-transition temperature was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak, in this heating step.

<Viscosity of Functional Layer Composition>

The viscosity (mPa·s) of the functional layer composition prepared was measured using a B-type viscometer at $25°$ C. and at a rotational speed of 60 rpm.

<Ion Conductivity of Functional Layer>

The functional layer-attached separator manufactured and a separator substrate prior to functional layer formation were measured for their Gurley number (sec/100 cc) using a Gurley meter (SMOOTH & POROSITY METER (measurement diameter: 2.9 cm), from Kumagai Riki Kogyo Co., Ltd.). Specifically, using Gurley number G0 for "separator substrate" prior to functional layer formation and Gurley number G1 for "functional layer-attached separator" after functional layer formation, % increase in the Gurley number $\Delta G$ (=G1/G0)×100) was calculated and evaluated based on the criteria below. A smaller % increase in the Gurley number $\Delta G$ indicates superior ion conductivity of the functional layer.

A: % increase $\Delta G$ is less than 150%
B: % increase $\Delta G$ is 150% or greater but less than 200%
C: % increase $\Delta G$ is 200% or greater but less than 250%
D: % increase $\Delta G$ is 250% or greater <Heat Resistance of Functional Layer-Attached Separator>

The functional layer-attached separator manufactured was cut into a 12 cm×12 cm square, and a 10 cm×10 cm square image was drawn within the square to prepare a test specimen. The test specimen was placed for 1 hour in a thermostat chamber set at $130°$ C., and % change in the area of the square image drawn on the square (=[(square area before placement in chamber)−(square area after placement in chamber)/square area before placement in chamber]×100] was found as a % thermal shrinkage and evaluated based on the criteria given below. A smaller % thermal shrinkage indicates superior heat resistance of the functional layer-attached separator.

A: % thermal shrinkage is less than 5%
B: % thermal shrinkage is 5% or greater to less than 10%
C: % thermal shrinkage is 10% or greater to less than 20%
D: % thermal shrinkage is 20% or greater <Peel Strength Between Functional Layer-Attached Separator and Electrode>

The manufactured laminate having a negative electrode and a functional layer-attached separator was cut into a 10 mm-width piece to prepare a test specimen. The test specimen was immersed in electrolysis solution for 3 days at $60°$ C. The electrolysis solution was prepared by dissolving supporting electrolyte $LiPF_6$ into a mixture solvent of ethylene carbonate, diethyl carbonate and vinylene carbonate (mixing ratio: ethylene carbonate/diethyl carbonate/vinylene carbonate=68.5/30/1.5 (by volume), SP value: 12.7 $(cal/cm^3)^{1/2}$) at a concentration of 1 mol/L.

The test specimen was then taken out from the electrolysis solution, the electrolysis solution on the surface of the test specimen was wiped off. An adhesive cellophane tape was then attached to the surface of the electrode (negative electrode) of the test specimen with the surface of the current collector of the electrode facing down. An adhesive cellophane tape specified in JIS Z1522 was used. The adhesive cellophane tape had been affixed on the horizontal test stage beforehand. Subsequently, the stress at the time when the separator was peeled by pulling up one end in the vertical direction at a pulling rate of 50 mm/min was measured. The measurement was made 3 times. An average of the measured stress values was recorded as peel strength (N/m). A greater peel strength indicates superior adhesion between the functional layer-attached separator and electrode.

<Low-Temperature Output Characteristics of Secondary Battery>

The manufactured spirally wound lithium ion secondary battery with a discharge capacity of 800 mAh was allowed to stand for 24 hours in the environment of $25°$ C., and then charged at 0.1 C and 4.2V for 5 hours in the environment of $25°$ C. Voltage V0 at that time was measured. The lithium ion secondary battery was discharged at 1 C in the environment of $-10°$ C., and a voltage measured 15 seconds after the initiation of discharge was recorded as V1. Voltage change $\Delta V$ (=V0−V1) was then found and evaluated based on the criteria given below. A smaller voltage change indicates superior low-temperature output characteristics.

A: Voltage change ΔV is less than 450 mV
B: Voltage change ΔV is 450 mV or greater to less than 600 mV
C: Voltage change ΔV is 600 mV or greater <Bulging Resistance of Secondary Battery>

The manufactured spirally wound lithium ion secondary battery with a discharge capacity of 800 mAh was allowed to stand for 24 hours in the environment of 25° C., and then charged at a constant voltage and constant a current of 4.35V and 0.1 C and discharged at a constant current of 0.1 C and 2.75V in the environment of 25° C. The spirally wound lithium ion secondary battery was immersed into liquid paraffin and its volume V'0 was measured. After measurement of volume V'0, the spirally wound secondary battery was taken out of the liquid paraffin, and in the environment of 60° C., the above-described charging/discharging was repeated for 1,000 cycles. The spirally wound secondary battery was again immersed into liquid paraffin and it volume V'1 was measured. % volume change between before and after 1,000 cycles of charge and discharge ΔV' (=[(V'1−V'0)/V'0]×100) was calculated to evaluate bulging resistance based on the criteria below. A smaller % volume change ΔV' indicates superior cell bulging resistance.

A: Volume change ΔV' is less than 40%
B: Volume change ΔV' is 40% or greater to less than 55%
C: Volume change ΔV' is 55% or greater <Cycle Characteristics of Secondary Battery>

The manufactured spirally wound lithium ion secondary battery with a discharge capacity of 800 mAh was allowed to stand for 24 hours in the environment of 25° C., and then charged at a constant voltage and constant a current of 4.35V and 0.1 C and discharged at a constant current of 0.1 C and 2.75V in the environment of 25° C., and initial capacity C0 was measured. In the environment of 60° C., the above-described charging/discharging was then repeated for 1,000 cycles, and capacity C1 after 1000 cycles was measured. % capacity maintenance after 1,000 cycles of charge and discharge ΔC (=(C1/C0)×100) was calculated and cycle characteristics were evaluated based on the criteria below. A higher % capacity maintenance ΔC indicates superior cycle characteristics and therefore higher battery characteristics.

A: % capacity maintenance ΔC is 85% or greater
B: % capacity maintenance ΔC is 75% to less than 85%
C: % capacity maintenance ΔC is less than 75%

Example 1

<Preparation of Organic Particles>

A 5 MPa pressure resistant vessel equipped with a stirrer was charged with, as monomers for core, 75 parts of methyl methacrylate as a (meth)acrylic acid ester monomer, 4 parts of methacrylic acid as a (meth)acrylic acid monomer and 1 part of ethylene glycol dimethacrylate (EDMA) as a crosslinkable monomer, 1 part of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. When the polymerization conversion rate reached 96%, a mixture of 19 parts of styrene as an aromatic vinyl monomer and 1 part of methacrylic acid as an acid group-containing monomer was then continuously added as monomers for shell, and the reaction mass was heated to 70 C.° to continue polymerization. When the polymerization conversion rate reached 96%, the reaction was quenched by cooling to produce a water dispersion containing organic particles. The resultant organic particles were measured for ratio of coverage, core-shell ratio, volume-average particle diameter D50, and density. The polymer of the organic particles was measured for degree of swelling in electrolysis solution. The results are shown in Table 2.

<Preparation of Particulate Polymer for Functional Layer>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate, the gas phase was purged with nitrogen gas, and the temperature was raised to 60° C.

In another vessel, 50 parts of ion-exchanged water, 0.5 parts of sodium dodecylbenzenesulfonate as a dispersant, 94 parts of butyl acrylate as a (meth)acrylic acid ester monomer, 2 parts of acrylonitrile, 2 parts of methacrylic acid, 1 part of N-methylol acrylamide, and 1 part of acrylamide were mixed to afford a monomer composition. The monomer mixture was continuously added to the reactor over 4 hours to effect polymerization. During addition, the temperature was retained at 60° C. for polymerization reaction. After completion of addition, the reaction mass was stirred for a further 3 hours at 70° C. to afford a water dispersion containing particulate polymer A for functional layer.

The resultant particulate polymer A for functional layer was measured for volume-average particle diameter D50 and glass-transition temperature. The results are shown in Table 2.

<Preparation of Functional Layer Composition>

80 parts of spherical barium sulfate (volume-average particle diameter D50: 0.7 μm, density: 4.5 g/cm$^3$) as non-conductive inorganic particles, 20 parts of the organic particles prepared above, and 1.5 parts of polyacrylamide as a viscosity modifier were mixed and dispersed in ion-exchanged water. 10 parts in solid content equivalent of the water dispersion containing the particulate polymer for functional layer prepared above and 0.2 parts of polyethylene glycol-based surfactant ("SAN NOPCO (registered trademark in Japan, other countries, or both) SN Wet 366" from SAN NOPCO Ltd.) as a wetting agent were mixed to prepare a functional layer composition.

The functional layer composition prepared was measured for viscosity. The results are shown in Table 2.

<Manufacture of Functional Layer and Functional Layer-Attached Separator>

As a separator substrate, an organic separator (thickness: 16 μm, Gurley number: 210 s/100 cc) made of polyethylene porous material was provided. The functional layer composition prepared above was applied on both sides of the substrate and dried at 50° C. for 3 minutes. In this way a separator having a functional layer of 5 μm thickness per side (functional layer-attached separator) was manufactured.

The resultant functional layer-attached separator was evaluated for ion conductivity and heat resistance. The results are shown in Table 2.

<Manufacture of Negative Electrode>

A 5 MPa pressure-resistant vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR) for negative electrode mixed material layer. After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or lower to afford a water dispersion containing a desired particulate binder.

Next, 100 parts of synthetic graphite (volume-average particle diameter D50: 15.6 μm) as a negative electrode active material, 1 part in solid content equivalent of 2% aqueous solution of sodium salt of carboxymethyl cellulose ("MAC350HC" from Nippon Paper Industries Co., Ltd) as a viscosity modifier and ion-exchanged water were mixed to a solid content concentration of 68%, and mixed for 60 minutes at 25° C. Subsequently, the solid content concentration was adjusted to 62% by the addition of ion-exchanged, and the mixture was further mixed at 25° C. for 15 minutes. To the mixture obtained was added 1.5 parts in solid content equivalent of the water dispersion containing the particulate binder and ion-exchanged water to a final solid content concentration of 52%, and further mixed for 10 minutes. The resultant mixture was subjected to defoaming treatment under reduced pressure to afford a slurry composition for negative electrode with good fluidity.

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness.

<Manufacture of Positive Electrode>

100 parts of $LiCoO_2$ as a positive electrode active material (volume-average particle diameter D50: 12 μm), 2 parts of acetylene black "(HS-100" from DENKI KAGAKU KOGYO KABUSHIKI KAISHA) as a conductor, 2 parts in solid content equivalent of polvinylidene difluoride (#7208 from KUREHA Corporation) as a binder, and N-methyl pyrrolidone were mixed to a total solid content concentration of 70%. These materials were mixed with a planetary mixer to prepare a positive electrode slurry composition.

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a web of positive electrode was obtained. The pre-press web of positive electrode was rolled with a roll press to afford a post-press positive electrode in which the positive electrode mixed material layer is 80 μm in thickness.

<Manufacture of Laminate with Electrode and Functional Layer-Attached Separator for Adhesion Evaluation>

The negative electrode and functional layer-attached separator obtained above were cut into a 14 mm-diameter circle and a 18 mm-diameter circle, respectively. After placing the negative electrode mixed material layer of the negative electrode onto the functional layer of the circular functional layer-attached separator, they were heat-pressed at 80° C. under a pressure of 0.5 MP for 10 seconds to manufacture a laminate including the negative electrode and functional layer-attached separator.

The resultant laminate was used to evaluate peel strength between the functional layer-attached separator and electrode. The results are shown in Table 2.

<Manufacture of Lithium Ion Secondary Battery>

The post-press positive electrode obtained above was cut into a 49 cm×5 cm piece and placed with the surface of the positive electrode mixed material layer facing up. A 55 cm×5.5 cm cut piece of the separator having a functional layer on both sides was placed on the surface of the positive electrode mixed material layer. Further, the post-press negative electrode obtained above was cut into a 50 cm×5.2 cm piece and placed on the functional layer-attached separator with the surface of the surface of the negative electrode mixed material layer facing the separator. This laminate was wound up by a winder into a roll. The roll was pressed at 60° C. under a pressure of 0.5 MPa to into a flat form and enclosed by an aluminum packaging case as a battery outer package. Electrolysis solution (solvent: ethylene carbonate/diethyl carbonate/vinylene carbonate=68.5/30/1.5 (by volume); electrolyte: 1M $LiPF_6$) was injected so as not to leave air. In order to tightly seal up the opening of the aluminum outer package, the aluminum package was closed by heat sealing at 150° C. In this way a spirally wound lithium ion secondary battery with a discharge capacity of 800 mAh was manufactured.

The resultant lithium ion secondary battery was evaluated for low-temperature output characteristics, bulging resistance, and cycle characteristics. The results are shown in Table 2.

Examples 2 and 3

Organic particles, particulates polymer for functional layer, functional layer compositions, functional layers, functional layer-attached separators, negative electrodes, positive electrodes, and laminates having an electrode and a functional layer-attached separator were prepared to manufacture lithium ion secondary batteries as in Example 1 except that the types and ratios of monomers used for core formation were changed as shown in Table 2 upon preparation of a water dispersion containing organic particles. Evaluations were then performed as in Example 1. The results are shown in Table 2.

Example 4

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that the types and ratios of monomers used for shell formation were changed as shown in Table 2 upon preparation of a water dispersion containing organic particles. Evaluations were then performed as in Example 1. The results are shown in Table 2.

Example 5

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that as non-conductive inorganic particles flat hydrated aluminum oxide (boehmite; volume-average particle diameter D50: 0.9 µm, density: 3.04 g/cm³) was used instead of spherical barium sulfate and the blending amount of polyacrylamide as a viscosity modifier was changed to 1.0 part upon preparation of a functional layer composition. Evaluations were then performed as in Example 1. The results are shown in Table 2.

Example 6

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that as non-conductive inorganic particles spherical barium titanate (volume-average particle diameter D50: 0.4 µm, density: 6.02 g/cm³) was used instead of spherical barium sulfate and the blending amount of polyacrylamide as a viscosity modifier was changed to 1.0 part upon preparation of a functional layer composition. Evaluations were then performed as in Example 1. The results are shown in Table 2.

Example 7

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that the blending amount of polyacrylamide as a viscosity modifier was changed to 2.0 parts upon preparation of a functional layer composition. Evaluations were then performed as in Example 1. The results are shown in Table 2.

Examples 8 and 9

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that the blending amounts of barium sulfate as non-conductive inorganic particles and organic particles were changed as shown in Table 2. Evaluations were then performed as in Example 1. The results are shown in Table 2.

Example 10

Organic particles, particulates polymer for functional layer, functional layer compositions, functional layers, functional layer-attached separators, negative electrodes, positive electrodes, and laminates having an electrode and a functional layer-attached separator were prepared to manufacture lithium ion secondary batteries as in Example 1 except that the types and ratios of monomers used for core and shell formation were changed as shown in Table 2 upon preparation of a water dispersion containing organic particles. The evaluations were then performed in the same manner as Example 1. The results are shown in Table 2.

Comparative Example 1

Organic particles, particulate polymer for functional layer, functional layer composition, functional layer, functional layer-attached separator, negative electrode, positive electrode, and laminate having an electrode and a functional layer-attached separator were prepared to manufacture a lithium ion secondary battery as in Example 1 except that as non-conductive inorganic particles spherical silica (volume-average particle diameter D50: 0.5 µm, density: 2.2 g/cm³) was used instead of spherical barium sulfate. Evaluations were then performed as in Example 1. The results are shown in Table 2.

Comparative Examples 2 to 4

Organic particles, particulates polymer for functional layer, functional layer compositions, functional layers, functional layer-attached separators, negative electrodes, positive electrodes, and laminates having an electrode and a functional layer-attached separator were prepared to manufacture lithium ion secondary batteries as in Example 1 except that the types and ratios of monomers used for core and shell formation were changed as shown in Table 2 upon preparation of a water dispersion containing organic particles. Evaluations were then performed as in Example 1. The results are shown in Table 2.

TABLE 2

| | | | | | Example 1 | Example 2 | Example 3 | Example 4 | Example 5 |
|---|---|---|---|---|---|---|---|---|---|
| Functional layer composition | Non-conductive inorganic particles | Type | | | Barium sulfate | Barium sulfate | Barium sulfate | Barium sulfate | Boehmite |
| | | Shape | | | Spherical | Spherical | Spherical | Spherical | Flat |
| | | Volume-average particle diameter D50 [µm] | | | 0.7 | 0.7 | 0.7 | 0.7 | 0.9 |
| | | Density [g/cm³] | | | 4.5 | 4.5 | 4.5 | 4.5 | 3.04 |
| | | Blending amount [parts by mass] | | | 80 | 80 | 80 | 80 | 80 |
| | Organic particles | Core | Composition | Methyl methacrylate [parts by mass] | 75 | — | 75.95 | 75 | 75 |
| | | | | Acrylonitrile [parts by mass] | — | 65 | — | — | — |
| | | | | Methacrylic acid [parts by mass] | 4 | 4 | 4 | 4 | 4 |
| | | | | 2-Ethylhexyl acrylate [parts by mass] | — | 10 | — | — | — |
| | | | | Styrene [parts by mass] | — | — | — | — | — |
| | | | | Ethylene glycol dimethacrylate [parts by mass] | 1 | 1 | 0.05 | 1 | 1 |
| | | | Glass-transition temperature [° C.] | | 90 | 100 | 90 | 90 | 90 |
| | | | Degree of swelling in electrolysis solution [—] | | 9.6 | 7.1 | 28.5 | 9.6 | 9.6 |
| | | Shell | Composition | Styrene [parts by mass] | 19 | 19 | 19 | 5 | 19 |
| | | | | Methacrylic acid [parts by mass] | 1 | 1 | 1 | — | 1 |
| | | | | Acrylonitrile [parts by mass] | — | — | — | 15 | — |
| | | | Glass-transition temperature [° C.] | | 105 | 105 | 105 | 120 | 105 |
| | | | Degree of swelling in electrolysis solution [—] | | 1.3 | 1.3 | 1.3 | 3.5 | 1.3 |

TABLE 2-continued

|  |  |  | | | | | |
|---|---|---|---|---|---|---|---|
|  |  | Core-Shell ratio [%] | 10 | 10 | 10 | 10 | 10 |
|  |  | Ratio of coverage [%] | 65 | 65 | 65 | 65 | 65 |
|  |  | Volume-average particle diameter D50 [μm] | 0.5 | 0.5 | 0.5 | 0.5 | 0.5 |
|  |  | Density [g/cm³] | 1.17 | 1.17 | 1.17 | 1.17 | 1.17 |
|  |  | Blending amount [parts by mass] | 20 | 20 | 20 | 20 | 20 |
|  | (Non-conductive inorganic particles' density − Organic particles' density) [g/cm³] | | 3.33 | 3.33 | 3.33 | 3.33 | 1.87 |
|  | Particulate polymer for fuctional layer | Type | Polymer A | Polymer A | Polymer A | Polymer A | Polymer A |
|  |  | (acrylonitrile unit)/(acrylonitrile unit + butyl acrylate unit) × 100 [% bymass] | 2.1 | 2.1 | 2.1 | 2.1 | 2.1 |
|  |  | Glass-transition temperature [° C.] | −30 | −30 | −30 | −30 | −30 |
|  |  | Volume-average particle diameter D50 [μm] | 0.3 | 0.3 | 0.3 | 0.3 | 0.3 |
|  |  | Blending amount (solid content equivalent of water dispersion) [parts by mass] | 10 | 10 | 10 | 10 | 10 |
|  | Viscosity modifier | Type | Polyacrylamide | Polyacrylamide | Polyacrylamide | Polyacrylamide | Polyacrylamide |
|  |  | Blending amount [parts by mass] | 1.5 | 1.5 | 1.5 | 1.5 | 1.0 |
|  | Wetting agent | Blending amount [parts by mass] | 0.2 | 0.2 | 0.2 | 0.2 | 0.2 |
| Evaluation | Viscosity [mPa · s] | | 20 | 20 | 20 | 20 | 50 |
|  | Ion conductivity of functional layer | | A | A | A | A | A |
|  | Heat resistance of functional layer-attached separator | | A | A | A | A | A |
|  | Peel strength between functional layer-attached separator and electrode [N/m] | | 3.5 | 3.3 | 3.5 | 3.1 | 2.5 |
|  | Low-temperature output characteristic of secondary battery | | A | A | A | B | A |
|  | Bulging resistance of secondary battery | | A | A | A | A | B |
|  | Cycle characteristic of secondary battery | | A | A | B | A | A |

|  |  |  | | | | | Example 6 | Example 7 | Example 8 | Example 9 | Example 10 |
|---|---|---|---|---|---|---|---|---|---|---|---|
| Functional layer composition | Non-conductive inorganic particles | Type | | | | | Barium titanate | Barium sulfate | Barium sulfate | Barium sulfate | Barium sulfate |
|  |  | Shape | | | | | Spherical | Spherical | Spherical | Spherical | Spherical |
|  |  | Volume-average particle diameter D50 [μm] | | | | | 0.4 | 0.7 | 0.7 | 0.7 | 0.7 |
|  |  | Density [g/cm³] | | | | | 6.02 | 4.5 | 4.5 | 4.5 | 4.5 |
|  |  | Blending amount [parts by mass] | | | | | 80 | 80 | 95 | 55 | 80 |
|  | Organic particles | Core | Composition | Methyl methacrylate [parts by mass] | | | 75 | 75 | 75 | 75 | 70.3 |
|  |  |  |  | Acrylonitrile [parts by mass] | | | — | — | — | — | — |
|  |  |  |  | Methacrylic acid [parts by mass] | | | 4 | 4 | 4 | 4 | 3.8 |
|  |  |  |  | 2-Ethylhexyl acrylate [parts by mass] | | | — | — | — | — | — |
|  |  |  |  | Styrene [parts by mass] | | | — | — | — | — | — |
|  |  |  |  | Ethylene glycol dimethacrylate [parts by mass] | | | 1 | 1 | 1 | 1 | 0.9 |
|  |  |  | Glass-transition temperature [° C.] | | | | 90 | 90 | 90 | 90 | 90 |
|  |  |  | Degree of swelling in electrolysis solution [—] | | | | 9.6 | 9.6 | 9.6 | 9.6 | 9.6 |
|  |  | Shell | Composition | Styrene [parts by mass] | | | 19 | 19 | 19 | 19 | 23.75 |
|  |  |  |  | Methacrylic acid [parts by mass] | | | 1 | 1 | 1 | 1 | 1.25 |
|  |  |  |  | Acrylonitrile [parts by mass] | | | — | — | — | — | — |
|  |  |  | Glass-transition temperature [° C.] | | | | 105 | 105 | 105 | 105 | 105 |
|  |  |  | Degree of swelling in electrolysis solution [—] | | | | 1.3 | 1.3 | 1.3 | 1.3 | 1.3 |
|  |  | Core-Shell ratio [%] | | | | | 10 | 10 | 10 | 10 | 20 |
|  |  | Ratio of coverage [%] | | | | | 65 | 65 | 65 | 65 | 85 |
|  |  | Volume-average particle diameter D50 [μm] | | | | | 0.5 | 0.5 | 0.5 | 0.5 | 0.5 |
|  |  | Density [g/cm³] | | | | | 1.17 | 1.17 | 1.17 | 1.17 | 1.17 |
|  |  | Blending amount [parts by mass] | | | | | 20 | 20 | 5 | 45 | 20 |
|  | (Non-conductive inorganic particles' density − Organic particles' density) [g/cm³] | | | | | | 4.85 | 3.33 | 3.33 | 3.33 | 3.33 |
|  | Particulate polymer for fuctional layer | Type | | | | | Polymer A | Polymer A | Polymer A | Polymer A | Polymer A |
|  |  | (acrylonitrile unit)/(acrylonitrile unit + butyl acrylate unit) × 100 [% bymass] | | | | | 2.1 | 2.1 | 2.1 | 2.1 | 2.1 |
|  |  | Glass-transition temperature [° C.] | | | | | −30 | −30 | −30 | −30 | −30 |
|  |  | Volume-average particle diameter D50 [μm] | | | | | 0.3 | 0.3 | 0.3 | 0.3 | 0.3 |
|  |  | Blending amount (solid content equivalent of water dispersion) [parts by mass] | | | | | 10 | 10 | 10 | 10 | 10 |
|  | Viscosity modifier | Type | | | | | Polyacrylamide | Polyacrylamide | Polyacrylamide | Polyacrylamide | Polyacrylamide |
|  |  | Blending amount [parts by mass] | | | | | 1.0 | 2.0 | 1.5 | 1.5 | 1.5 |
|  | Wetting agent | Blending amount [parts by mass] | | | | | 0.2 | 0.2 | 0.2 | 0.2 | 0.2 |
| Evaluation | Viscosity [mPa · s] | | | | | | 20 | 60 | 30 | 15 | 20 |
|  | Ion conductivity of functional layer | | | | | | B | A | B | A | A |
|  | Heat resistance of functional layer-attached separator | | | | | | A | A | A | B | A |
|  | Peel strength between functional layer-attached separator and electrode [N/m] | | | | | | 3.1 | 2.8 | 2.3 | 3.2 | 3.5 |
|  | Low-temperature output characteristic of secondary battery | | | | | | A | A | B | A | A |
|  | Bulging resistance of secondary battery | | | | | | A | B | B | A | A |
|  | Cycle characteristic of secondary battery | | | | | | A | A | A | A | A |

TABLE 2-continued

|  |  |  |  | Comparative Examle 1 | Comparative Examle 2 | Comparative Examle 3 | Comparative Examle 4 |
|---|---|---|---|---|---|---|---|
| Functional layer composition | Non-conductive inorganic particles | Type | | Silica | Barium sulfate | Barium sulfate | Barium sulfate |
|  |  | Shape | | Spherical | Spherical | Spherical | Spherical |
|  |  | Volume-average particle diameter D50 [μm] | | 0.5 | 0.7 | 0.7 | 0.7 |
|  |  | Density [g/cm³] | | 2.2 | 4.5 | 4.5 | 4.5 |
|  |  | Blending amount [parts by mass] | | 80 | 80 | 80 | 80 |
|  | Organic particles | Core | Composition Methyl methacrylate [parts by mass] | 75 | — | 50 | 50 |
|  |  |  | Acrylonitrile [parts by mass] | — | — | 25 | — |
|  |  |  | Methacrylic acid [parts by mass] | 4 | 5 | 5 | 5 |
|  |  |  | 2-Ethylhexyl acrylate [parts by mass] | — | 60 | — | 25 |
|  |  |  | Styrene [parts by mass] | — | 15 | — | — |
|  |  |  | Ethylene glycol dimethacrylate [parts by mass] | 1 | — | — | — |
|  |  |  | Glass-transition temperature [° C.] | 90 | 80 | 125 | 40 |
|  |  |  | Degree of swelling in electrolysis solution [—] | 9.6 | 3.8 | 32 | 10.5 |
|  |  | Shell | Composition Styrene [parts by mass] | 19 | 20 | 20 | — |
|  |  |  | Methacrylic acid [parts by mass] | 1 | — | — | — |
|  |  |  | Acrylonitrile [parts by mass] | — | — | — | 20 |
|  |  |  | Glass-transition temperature [° C.] | 105 | 100 | 100 | 130 |
|  |  |  | Degree of swelling in electrolysis solution [—] | 1.3 | 1.3 | 1.3 | 4.5 |
|  |  | Core-Shell ratio [%] | | 10 | 10 | 10 | 10 |
|  |  | Ratio of coverage [%] | | 65 | 65 | 65 | 65 |
|  |  | Volume-average particle diameter D50 [μm] | | 0.5 | 0.5 | 0.5 | 0.5 |
|  |  | Density [g/cm³] | | 1.17 | 1.17 | 1.17 | 1.17 |
|  |  | Blending amount [parts by mass] | | 20 | 20 | 20 | 20 |
|  | (Non-conductive inorganic particles' density − Organic particles' density) [g/cm³] | | | 1.03 | 3.33 | 3.33 | 3.33 |
|  | Particulate polymer for fuctional layer | Type | | Polymer A | Polymer A | Polymer A | Polymer A |
|  |  | (acrylonitrile unit)/(acrylonitrile unit + butyl acrylate unit) × 100 [% bymass] | | 2.1 | 2.1 | 2.1 | 2.1 |
|  |  | Glass-transition temperature [° C.] | | −30 | −30 | −30 | −30 |
|  |  | Volume-average particle diameter D50 [μm] | | 0.3 | 0.3 | 0.3 | 0.3 |
|  |  | Blending amount (solid content equivalent of water dispersion) [parts by mass] | | 10 | 10 | 10 | 10 |
|  | Viscosity modifier | Type | | Polyacryl-amide | Polyacryl-amide | Polyacryl-amide | Polyacrylamide |
|  |  | Blending amount [parts by mass] | | 1.5 | 1.5 | 1.5 | 1.5 |
|  | Wetting agent | Blending amount [parts by mass] | | 0.2 | 0.2 | 0.2 | 0.2 |
|  | Viscosity [mPa · s] | | | 30 | 20 | 30 | 20 |
| Evaluation | Ion conductivity of functional layer | | | A | A | A | A |
|  | Heat resistance of functional layer-attached separator | | | B | A | A | A |
|  | Peel strength between functional layer-attached separator and electrode [N/m] | | | 0.9 | .7 | 2.5 | 0.9 |
|  | Low-temperature output characteristic of secondary battery | | | A | A | A | A |
|  | Bulging resistance of secondary battery | | | C | C | B | C |
|  | Cycle characteristic of secondary battery | | | C | B | C | B |

The results shown in Table 2 reveal that Examples 1 to 9 wherein a composition containing organic particles formed of polymers having specific degrees of swelling in electrolysis solution and having a specific core-shell structure, and non-conductive inorganic particles having 1.5 g/cm³ or higher density than the organic particles was used can provide firm adhesion between the separator and electrode in electrolysis solution while allowing the separator to exert high heat resistance and thus can provide a secondary battery having good battery characteristics.

The results shown in Table 2 reveal that Comparative Example 1 wherein the difference in density between the non-conductive inorganic particles and organic particles is less than 1.5 g/cm³ provide low adhesion between the separator and electrode in electrolysis solution and thus fails to provide a secondary battery having superior bulging resistance and superior battery characteristics such as cycle characteristics.

The results shown in Table 2 reveal that Comparative Example 2 wherein the core polymer has a degree of swelling in electrolysis solution of less than a specific lower limit value provides low adhesion between the separator and electrode in electrolysis solution and thus fails to provide a secondary battery having superior bulging resistance, and that Comparative Example 3 wherein the core polymer has a degree of swelling in electrolysis solution of greater than a specific upper limit value fails to provide a secondary battery having superior battery characteristics such as cycle characteristics.

The results shown in Table 2 reveal that Comparative Example 4 wherein the shell polymer has a degree of swelling in electrolysis solution of greater than a specific upper limit value provides low adhesion between the separator and electrode in electrolysis solution and thus fails to provide a secondary battery having superior bulging resistance and superior battery characteristics such as cycle characteristics.

The results of Examples 1 to 4 shown in Table 2 reveal that adjustment of the degrees of swelling in electrolysis solution of the organic particle polymers can improve battery characteristics of a secondary battery such as low-temperature output characteristic and cycle characteristics.

The results of Examples 1, 5 and 6 shown in Table 2 reveal that changing non-conductive inorganic particles can increase ion conductivity of the functional layer, adhesion between the separator and electrode, and bulging resistance of a secondary battery.

The results of Examples 1 and 7 shown in Table 2 reveal that adjustment of the viscosity of the functional layer composition by changing the blending amount of a viscosity modifier can increase adhesion between the separator and electrode and bulging resistance of a secondary battery.

The results of Examples 1, 8 and 9 shown in Table 2 reveal that changing the ratio between organic particles and non-conductive inorganic particles in the functional layer composition can increase ion conductivity of the functional layer, heat resistance, adhesion between the separator and electrode, and bulging resistance and low-temperature output characteristics of a secondary battery.

INDUSTRIAL APPLICABILITY

According to this disclosure, it is possible to provide a composition for non-aqueous secondary battery functional layer that can form a functional layer for non-aqueous secondary battery that can exert protection function and adhesion function with a single layer and may firmly bond together an electrode and a separator in electrolysis solution while ensuring battery characteristics. According to this disclosure, it is also possible to provide a functional layer for non-aqueous secondary battery that can exert protection function and adhesion function with a single layer and may firmly bond together battery members in electrolysis solution while ensuring battery characteristics. According to this disclosure, it is also possible to provide a non-aqueous secondary battery that includes the functional layer for non-aqueous secondary battery and thus exhibits superior battery characteristics and superior productivity.

REFERENCE SIGNS LIST 100 organic particles
110 core
110S outer surface of core
120 shell

The invention claimed is:

1. A composition for non-aqueous secondary battery functional layer, comprising:
 non-conductive inorganic particles; and
 organic particles, wherein
 a difference in density calculated by subtracting the organic particles' density from the non-conductive inorganic particles' density is 1.5 g/cm$^3$ or more, and
 the organic particles each have a core-shell structure having a core and a shell that partially covers an outer surface of the core, wherein the core is made of polymer having a degree of swelling in electrolysis solution of 5 times to 30 times, and the shell is made of polymer having a degree of swelling in electrolysis solution of greater than 1 time to 4 times,
 wherein the degree of swelling of polymer in electrolysis solution is calculated by W1/W0, where W0 indicates a weight of a film fabricated using the polymer, and W1 indicates a weight of the film after immersing into an electrolysis solution at 60° C. for 72 hours, the electrolysis solution being obtained by dissolving LiPF$_6$ into a mixture solvent of 68.5% by volume of ethylene carbonate, 30 vol % of diethyl carbonate, and 1.5 vol % of vinylene carbonate at a concentration of 1 mol/L.

2. The composition of claim 1, wherein a percentage of an amount of the non-conductive inorganic particles contained in the composition relative to a total amount of the non-conductive inorganic particles and the organic particles contained in the composition is greater than 50% by mass to 98% by mass.

3. The composition of claim 1, having a viscosity of 1 mPa·s to 100 mPa·s.

4. A functional layer for non-aqueous secondary battery formed by a method comprising:
 applying onto a substrate the composition of claim 1; and
 drying the composition applied.

5. The functional layer of claim 4, exhibiting adhesion between a separator and an electrode of the non-aqueous secondary battery in electrolysis solution.

6. A non-aqueous secondary battery comprising:
 a separator having the functional layer of claim 4 formed therein; and
 an electrode.

7. The non-aqueous secondary battery of claim 6, wherein the functional layer exhibits adhesion between the separator and the electrode of the non-aqueous secondary battery in electrolysis solution.

8. The functional layer of claim 5, having peel strength of 1 N/m or more.

9. The non-aqueous secondary battery of claim 7, wherein the functional layer has peel strength of 1 N/m or more.

* * * * *